United States Patent
Ramamurthy

(10) Patent No.: US 12,214,870 B2
(45) Date of Patent: Feb. 4, 2025

(54) INFLIGHT REDUCED ENGINE OPERATION, ENGINE RESTART, AND ASSOCIATED ALERTS

(71) Applicant: Textron Innovations Inc., Providence, RI (US)

(72) Inventor: Bharath Ramamurthy, Bengaluru (IN)

(73) Assignee: Textron Innovations Inc., Providence, RI (US)

( * ) Notice: Subject to any disclaimer, the term of this patent is extended or adjusted under 35 U.S.C. 154(b) by 231 days.

(21) Appl. No.: 17/941,776

(22) Filed: Sep. 9, 2022

(65) Prior Publication Data
US 2024/0083570 A1   Mar. 14, 2024

(51) Int. Cl.
| B64C 27/04 | (2006.01) |
| B64D 27/24 | (2006.01) |
| B64D 31/00 | (2006.01) |
| B64D 45/00 | (2006.01) |
| B64D 43/00 | (2006.01) |

(52) U.S. Cl.
CPC .............. B64C 27/04 (2013.01); B64D 27/24 (2013.01); B64D 31/00 (2013.01); B64D 45/00 (2013.01); B64D 43/00 (2013.01); B64D 2045/0085 (2013.01)

(58) Field of Classification Search
CPC ......... F05D 2220/329; F05D 2270/091; F05D 2270/093; F05D 2270/095; F02K 3/12; F02C 9/46; B64C 27/04; B64D 27/24; B64D 31/00; B64D 45/00; B64D 43/00; B64D 2045/0085
See application file for complete search history.

(56) References Cited

U.S. PATENT DOCUMENTS

| 3,310,937 | A | 3/1967 | Smith |
| 5,867,979 | A | 2/1999 | Newton et al. |
| 7,414,544 | B2 | 8/2008 | Oltheten et al. |
| 10,094,293 | B2 | 10/2018 | Perkinson et al. |
| 10,773,814 | B2 | 9/2020 | Strauss et al. |
| 2013/0219905 | A1* | 8/2013 | Marconi ................. F02C 7/268 60/39.12 |
| 2022/0204173 | A1* | 6/2022 | Barraco ................. B64D 27/24 |
| 2023/0211876 | A1 | 7/2023 | Parsons |

OTHER PUBLICATIONS

Barth et al., "Engine quick start in case of emergency—A requirement for saving fuel by means of engine shutdown," Research Gate, https://www.researchgate.net/publication/283673973, Jan. 2012, 9 pages.

\* cited by examiner

Primary Examiner — Todd E Manahan
Assistant Examiner — Rodolphe Andre Chabreyrie
(74) Attorney, Agent, or Firm — Slater Matsil, LLP

(57) ABSTRACT

In certain embodiments, a rotorcraft includes a first engine, a second engine, a primary engine-start system for the first engine, a fast-start engine-start system for the first engine, and a computer system. The computer system is configured to detect a failure of the second engine during a reduced engine operation (REO) flight mode in which the first engine has been intentionally shut down inflight and the second engine is to remain operational, and to automatically initiate, in response to detecting the failure of the second engine during the REO flight mode, an automatic restart of the first engine using the fast-start engine-start system.

12 Claims, 14 Drawing Sheets

INFLIGHT REDUCED ENGINE OPERATION, ENGINE RESTART, AND ASSOCIATED ALERTS

TECHNICAL FIELD

This disclosure relates generally to aircraft, and, in particular embodiments, to inflight reduced engine operation, engine restart, and associated alerts.

BACKGROUND

Aircraft include one or more engines for powering one or more components of the aircraft. In the case of rotorcraft, for example, the one or more engines drive operation of various rotorcraft components, such as one or more rotor blades (e.g., a main rotor blade and potentially a tail rotor blade). In some aircraft designs, multiple engines are used. Incorporating multiple engines may serve various purposes. As an example, multiple engines may be used to maintain an aircraft in flight in the case of single-engine failure.

SUMMARY

In certain embodiments, a rotorcraft includes a first engine, a second engine, a primary engine-start system for the first engine, a fast-start engine-start system for the first engine, and a computer system. The computer system is configured to detect a failure of the second engine during a reduced engine operation (REO) flight mode in which the first engine has been intentionally shut down inflight and the second engine is to remain operational, and to automatically initiate, in response to detecting the failure of the second engine during the REO flight mode, an automatic restart of the first engine using the fast-start engine-start system.

In certain embodiments, a rotorcraft includes a first engine, a second engine, a primary run/off switch for the first engine, an REO on/off switch, and a computer system. The REO on/off switch is configured to send, in response to being positioned in an on position, an engine shutoff signal. The REO on/off switch is distinct from the primary run/off switch for the first engine. The computer system is configured to receive the engine shutoff signal and command, in response to receiving the engine shutoff signal, the first engine to shut off to enter the REO flight mode in which the first engine has been intentionally shut down inflight and the second engine is to remain operational. The primary run/off switch for the first engine remains in the on position while the first engine is shut down during the REO flight mode.

In certain embodiments, a method includes detecting, for a rotorcraft that includes a first engine and a second engine and that is in flight operating using both the first engine and the second engine, availability of an REO flight mode in which in which the first engine is intentionally shut down inflight and the second engine is to remain operational and initiating a shutdown of the first engine to enter the REO flight mode. Initiating the shutdown of the first engine includes bypassing a primary shutdown system for the first engine and shutting down the first engine using a secondary shutdown system.

BRIEF DESCRIPTION OF THE DRAWINGS

For a more complete understanding of this disclosure, and advantages thereof, reference is now made to the following descriptions taken in conjunction with the accompanying drawings, in which.

DETAILED DESCRIPTION OF ILLUSTRATIVE EMBODIMENTS

Figure 1:
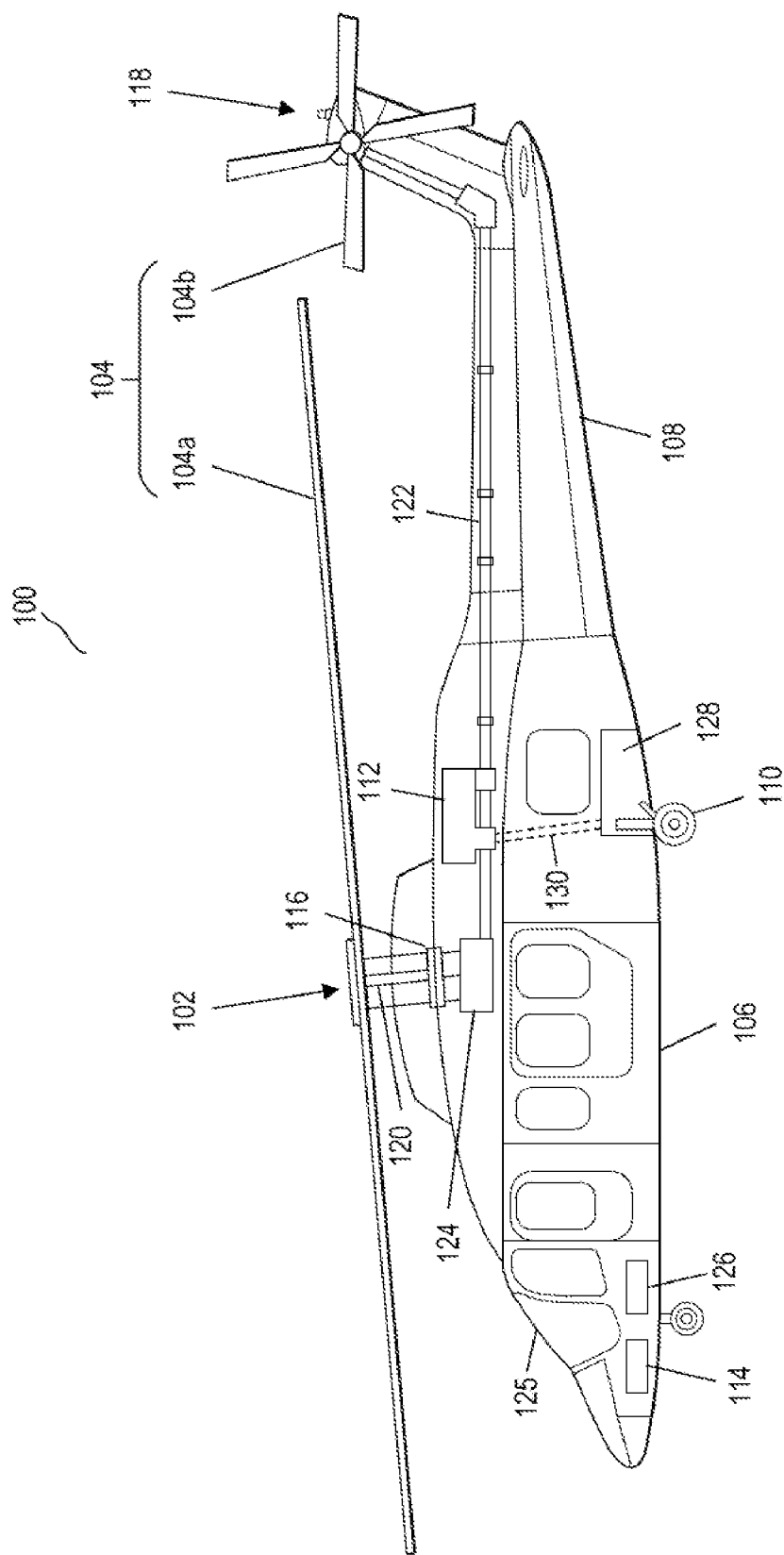
FIG. 1 illustrates aspects of an example rotorcraft, according to certain embodiments.

For aircraft that include multiple engines, it may be possible to intentionally shut down one or more of the engines inflight when certain conditions are met, and leave one or more remaining engines active to maintain the aircraft in flight. For example, while multiple engines may be used for certain portions of an aircraft's operation (e.g., take-off, landing, some or all of the ascent, some or all of the descent), it may be possible to operate the aircraft in flight (e.g., during a cruise phase of the flight) using a reduced number of engines. As a particular example, for an aircraft that includes two engines, it may be possible to intentionally shut down one of the two engines inflight and operate the aircraft for at least a portion of a flight using only one of the two engines.

Throughout this disclosure a flight mode in which, for at least a portion of a flight, at least one engine of a multi-engine aircraft is intentionally shutdown inflight and at least one other engine is to remain active, may be referred to as reduced engine operation (REO), an REO mode, or an REO flight mode. An example of REO flight mode is one-engine cruise (OEC) mode, sometimes referred to as a single-engine cruise (SEC) mode. For example, OEC flight mode involves intentional shutdown of one engine during a portion of a flight (e.g., a cruise segment), while leaving another engine active. The shut-down engine may then be restarted inflight, when appropriate. Certain embodiments of this disclosure provide for an REO flight mode and associated features.

Operating an aircraft in an REO flight mode may provide certain benefits. For example, REO may save fuel because a reduced number of engines (e.g., one of two engines) use fuel during REO. As another example, an REO flight mode may decrease noise associated with operating an aircraft, as fewer engines are operating and generating associated noise during REO flight mode. As another example, REO may reduce emissions associated with operating an aircraft, as fewer engines are operating and generating emissions during REO flight mode.

Certain risks may be associated with shutting down an engine while in flight. For example, if the operating engine fails during single-engine flight, then the shut-down engine should be restarted to allow the flight to continue and facilitate safe landing. Restarting the intentionally shut-down engine inflight can be difficult using convention flight control systems, generally increasing crew workload.

Certain embodiments of this disclosure provide for automatic restart of an engine that has been shut down for REO flight mode when the operating engine fails, which may reduce crew workload in such a scenario. For a rotorcraft, during inflight failure of an operating engine during REO (e.g., during OEC), the crew is burdened with maintaining safe control of the rotorcraft without power to the rotors, which may significantly increase crew workload and stress. Attempting to unburden the crew of restarting the shut-down engine may decrease crew workload.

Additionally, aircraft generally include one or more information interfaces that inform the crew about flight status, equipment status, and the like. Such information interfaces may include mechanical or digital indicators, displays, or sounds, such as flight instrumentation, power situation indicators, and/or other types of information interfaces. Providing suitable annunciations (visual, audible, and/or otherwise) related to REO flight mode may reduce or eliminate distractions to a pilot during various events that may occur in relation to REO flight mode operation. Certain embodiments of this disclosure provide rotorcraft situational awareness to the flight crew to safely fly the rotorcraft during the REO flight phase.

This disclosure primarily describes an example in which the aircraft is a rotorcraft (e.g., helicopter) with at least two engines (e.g., twin turbine engines) for driving at least one rotor; however, this disclosure may apply to any suitable type of aircraft or even other types of vehicles where shutting down and/or restarting a dormant engine may be performed. Additionally, this disclosure primarily describes an example in which the aircraft includes two engines (e.g., a twin-engine rotorcraft); however, this disclosure may apply to an aircraft or other vehicle having two or more engines.

FIG. 1 illustrates aspects of an example rotorcraft 100, according to certain embodiments. It should be appreciated that some of teachings from rotorcraft 100 may apply to aircraft other than rotorcraft, such as airplanes, tilt rotor aircraft, unmanned aircraft, and the like. Rotorcraft 100 includes a main rotor system 102, rotor blades 104, a fuselage 106 (also referred to as an airframe), a tail section 108, landing gear 110, multiple engines 112, and one or more aircraft computer systems 114.

Main rotor system 102 includes main rotor blades 104a. The pitch of each main rotor blade 104a may be controlled by a swashplate 116 to selectively control the attitude, altitude and movement of rotorcraft 100. Swashplate 116 may be used to collectively and/or cyclically change the pitch of main rotor blades 104a.

Rotorcraft 100 also has an anti-torque system, which may include a tail rotor, no-tail-rotor (NOTAR), or dual main rotor system. In the illustrated example, rotorcraft 100 includes tail rotor 118 having tail rotor blades 104b. The pitch of each tail rotor blade 104b may be collectively changed to vary thrust of the anti-torque system, providing directional control of rotorcraft 100. The pitch of tail rotor blades 104b may be changed by one or more tail rotor actuators.

Power is supplied to main rotor system 102 to rotate main rotor blades 104a and/or to tail rotor 118 to rotate tail rotor blades 104b, using one or more engines 112. For example, engines 112 may supply an output (e.g., torque) to rotor mast 120 via drive shaft 122, which is mechanically and operatively coupled to main rotor system 102 through a main rotor transmission 124, to rotate main rotor blades 104a. As another example, engines 112 may supply an output (e.g., torque) to tail rotor 118 via drive shaft 122, which is mechanically and operatively coupled to tail rotor 118 through a tail rotor transmission, to rotate tail rotor blades 104b. Engines 112, rotor mask 120, and drive shaft 122 may form at least a portion of what may be referred to as a powertrain of rotorcraft 100, and the powertrain may be configured to rotate main rotor blades 104a and/or tail rotor blades 104b.

Although this disclosure contemplates engines 112 being implemented in any suitable manner, in certain embodiments, engines 112 may be gas turbine (e.g., turboshaft) engines. In a particular example, rotorcraft 100 includes a pair of engines 112, which may be referred to as twin turbine engines.

Fuselage 106 represents the body of rotorcraft 100 and is coupled to the powertrain such that the powertrain and rotor blades 104 move fuselage 106 through the air during operation. Fuselage 106 includes a cockpit 125, which includes displays, controls, and instruments. Although rotorcraft 100 is depicted as having certain illustrated features, rotorcraft 100 may have a variety of implementation-specific configurations. For example, in certain embodiments, cockpit 125 is configured to accommodate a pilot or a pilot and co-pilot (and/or additional crew), as illustrated. This disclosure contemplates, however, that rotorcraft 100 may be operated remotely, in which case cockpit 125 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other embodiments, rotorcraft 100 could be configured as an unmanned vehicle, in which case cockpit 125 could be eliminated entirely to save space and cost.

Landing gear 110 (e.g., wheels, rails, or the like) supports rotorcraft 100 when rotorcraft 100 is grounded. Tail section 108 represents the tail section of rotorcraft 100 and is connected to tail rotor 118/tail rotor blades 104b. The tail section 108 may have other flight control devices such as horizontal or vertical stabilizers, rudder, elevators, or other control or stabilizing surfaces that are used to control or stabilize flight of rotorcraft 100. The powertrain and tail rotor blades 104b may collectively provide thrust in the same direction as the rotation of main rotor blades 104a, so as to counter torque effects created by main rotor blades 104a.

Rotorcraft 100 includes flight control devices operable to change the flight characteristics of rotorcraft 100. The flight control devices can be part of the powertrain, main rotor system 102, rotor blades 104, fuselage 106, and the like. The flight control devices include mechanical and/or electrical systems operable to change, e.g., the positions or angle of attack of rotor blades 104, the power output of engines 112, and the like. In certain embodiments, the flight control devices include a swashplate 116 or other device for collectively or cyclically controlling the pitch of each of main rotor blades iota to selectively control direction, thrust, and lift of rotorcraft 100. In certain embodiments, the flight control devices include a tail rotor actuator for collectively controlling the pitch of tail rotor blades 104b to selectively control yaw of rotorcraft 100. In certain embodiments, the flight control devices include an engine control computer for selectively varying the power output of engines 112. Other examples of flight control devices include horizontal or vertical stabilizers, rudder, elevators, or other control or stabilizing surfaces that are used to control or stabilize flight of rotorcraft 100.

Aircraft computer systems 114 include any of the computers that operate to collect and/or analyze data related to rotorcraft 100 or its environment, control operation of one or more components of rotorcraft 100, or perform other suitable operations. Aircraft computer systems 114 may include flight control computers, cockpit display unit(s), the aforementioned engine control computers, and/or other processing devices. In certain embodiments, aircraft computer systems 114 are operable to collect data about, or control flight of, rotorcraft 100. Rotorcraft 100 may be a fly-by-wire (FBW) rotorcraft, and aircraft computer systems 114 include flight control computers operable to execute one or more control laws (CLAWS) that control flight of rotorcraft 100. For example, aircraft computer systems 114 can send electrical signals to engines 112, the actuators for swashplate 116, the tail rotor actuators, or the like to control flight of rotorcraft 100. Aircraft computer systems 114 may be operable to perform sensor data collection and analysis as part of a health and usage monitoring system (HUMS), a flight control system, a sensor system, a monitoring system, or the like.

Although aircraft computer systems 114 are shown to be a part of rotorcraft 100, this disclosure contemplates some or all of the processing devices that make up aircraft computer systems 114 being located on or remote from rotorcraft 100. In the case of some or all of the processing devices that make up aircraft computer systems 114 being located remote from rotorcraft 100, such processing devices may communicate with rotorcraft 100 (e.g., processing devices located on rotorcraft 100) using a suitable wireless communication technology.

As described in greater detail below, aircraft computer systems 114, along with other components of rotorcraft 100, may be configured to operate rotorcraft 100 in an REO flight mode in which at least one of engines 112 is intentionally shut down inflight while at least one other engine 112 is intended to remain active/operational while the at least one engine 112 is the shut-down state. Additionally, as described in greater detail below, rotorcraft 100, including aircraft computer systems 114, may be configured to facilitate an inflight engine auto-restart capability, along with other associated features, such as a backup manual restart capability. Additionally, as described in greater detail below, rotorcraft 100, including aircraft computer systems 114, may be configured to provide certain annunciations in connection with REO flight mode.

Rotorcraft 100 includes power supply system 126, which may include one or more batteries of any suitable type. Power supply system 126 is configured to provide electrical power to power electrical components of rotorcraft 100, such as to aircraft computer systems 114 and/or other flight control devices (e.g., switches, actuators, etc.).

Rotorcraft 100 includes fuel system 128, which may include one or more fuel cells/tanks, one or more fuel lines 130, and other components for distributing fuel to other appropriate components of rotorcraft 100, such as to engines 112.

Figure 2:
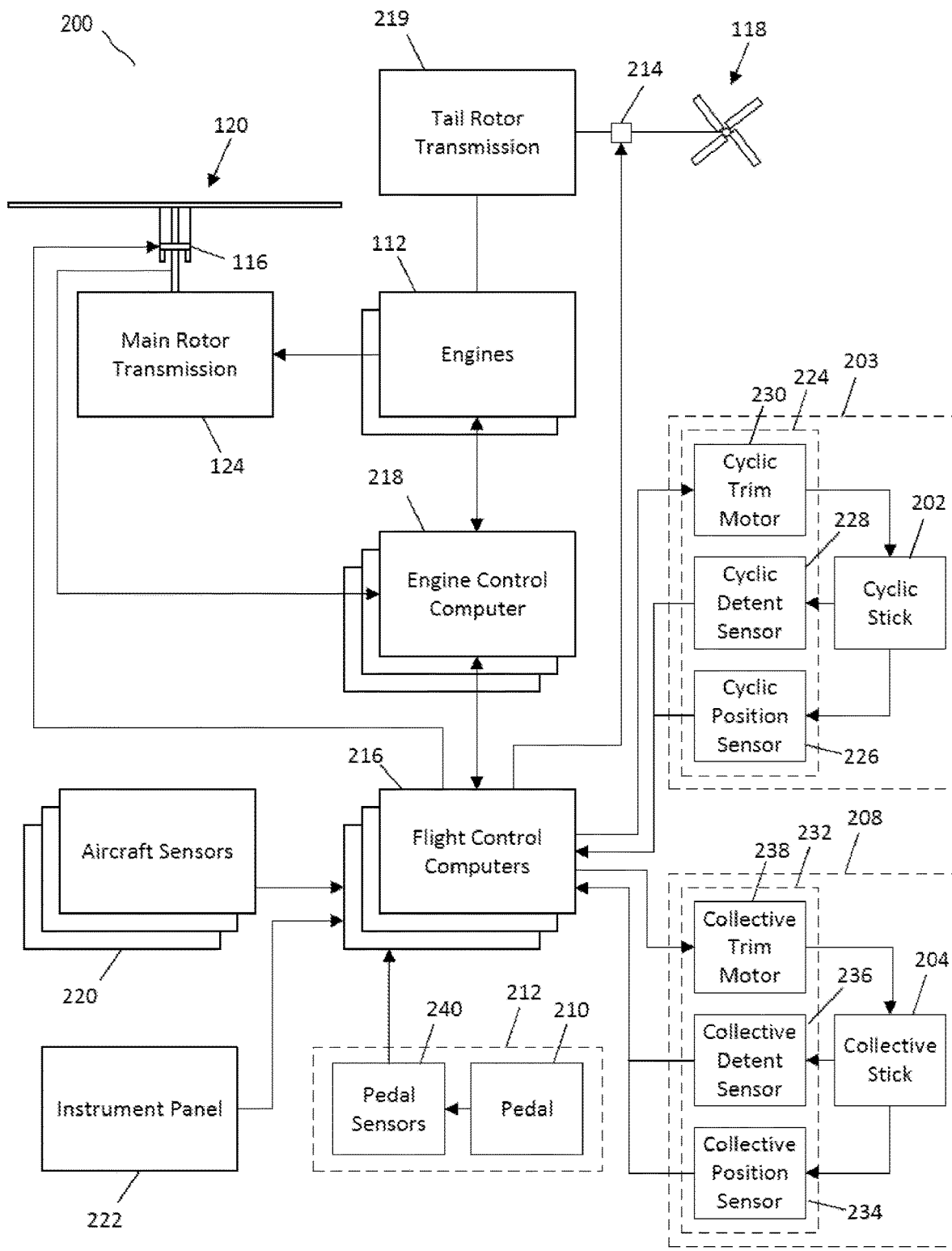
FIG. 2 illustrates a representation of a flight control system for a rotorcraft, according to certain embodiments.

FIG. 2 illustrates a representation of a flight control system 200 for a rotorcraft (e.g., rotorcraft 100), according to certain embodiments. Flight control system 200 may implement some or all of an FBW system.

A pilot may manipulate one or more pilot flight controls in order to control flight of the rotorcraft. The pilot flight controls may include manual controls such as a cyclic stick 202 in a cyclic control assembly 203, a collective stick 206 in a collective control assembly 208, and pedals 210 in a pedal control assembly 212. Inputs provided by the pilot to the pilot flight controls may be transmitted mechanically and/or electronically to flight control devices by the flight control system 200. Flight control devices may represent devices operable to change flight characteristics of rotorcraft 100. Flight control devices on rotorcraft 100 may include mechanical and/or electrical systems operable to change the positions or angle of attack of rotor blades 104 or to change the power output of the engines 112, as examples. Flight control devices include systems such as the swashplate 116, tail rotor actuator 214, and systems operable to control the engines 112. Flight control system 200 may adjust the flight control devices independently of the flight crew in order to stabilize rotorcraft 100, reduce workload of the flight crew, and the like.

Flight control system 200 may include flight control computers (FCCs) 216, engine control computers (which also may be referred to as engine control computer units, or engine control computers) 218, and aircraft sensors 220, which collectively adjust the flight control devices.

Flight control system 200 includes one or more flight control computers 216. In certain embodiments, multiple flight control computers 216 are provided for redundancy. One or more modules within flight control computers 216 may be partially or wholly embodied in any suitable combination of hardware, firmware, and software for performing any operations described herein. In embodiments where flight control system 200 is an FBW flight control system, flight control computers 216 may analyze pilot inputs and dispatch corresponding commands to engine control computers 218, tail rotor actuator 214, and/or actuators for the swashplate 116. Further, flight control computers 216 may be configured by and receive input commands from the pilot controls through sensors associated with each of the pilot flight controls. The input commands may be received by measuring the positions of the pilot controls. Flight control computers 216 also may control tactile cues to the pilot controls or display information in instruments on, for example, an instrument panel 222.

Flight control system 200 includes one or more engine control computers 218, which also may be referred to as engine control computing units, or ECCUs). In certain embodiments, a respective engine control computer 218 is provided for each engine 112. One or more modules within engine control computers 218 may be partially or wholly embodied in any suitable combination of hardware, firmware, and software for performing any operations described herein. Engine control computers 218 control engines 112. For example, engine control computers 218 may vary the output power of engines 112 to control the rotational speed of main rotor blades 104a through main rotor transmission 124 and tail rotor blades 104b through tail rotor transmission 219. Engine control computers 218 may control the output power of engines 112 according to commands from flight control computers 216, feedback such as measured RPM of main rotor blades 104a, or other suitable input.

Aircraft sensors 220 are in communication with flight control computers 216. Aircraft sensors 220 may include sensors for measuring a variety of rotorcraft systems, flight parameters, environmental conditions, and the like. For example, aircraft sensors 220 may include sensors for measuring airspeed, altitude, attitude, position, orientation, temperature, airspeed, vertical speed, and the like. Other aircraft sensors 220 could include sensors relying upon data or signals originating external to rotorcraft 100, such as a global positioning system (GPS) sensor, a VHF Omnidirectional Range sensor, Instrument Landing System (ILS), and the like.

Cyclic control assembly 203 is connected to a cyclic trim assembly 224 having one or more cyclic position sensors 226, one or more cyclic detent sensors 228, and one or more cyclic actuators or cyclic trim motors 230. Cyclic position sensors 226 measure the position of cyclic stick 202. In certain embodiments, cyclic stick 202 is a single control stick that moves along two axes and permits a pilot to control pitch, which is the vertical angle of the nose of rotorcraft 100 and roll, which is the side-to-side angle of rotorcraft 100. In certain embodiments, cyclic control assembly 204 has separate cyclic position sensors 226 that measure roll and pitch separately. Cyclic position sensors 226 for detecting roll and pitch generate roll and pitch signals, respectively, (sometimes referred to as cyclic longitude and cyclic latitude signals, respectively) which are sent to flight control computers 216, which controls the swashplate 116, engines 112, tail rotor 118, or related flight control devices.

Cyclic trim motors 230 are connected to flight control computers 216, and receive signals from flight control computers 216 to move cyclic stick 202. In certain embodiments, flight control computers 216 determine a suggested cyclic stick position for cyclic stick 202 according to one or more of the collective stick position; the pedal position; the speed, altitude, and attitude of rotorcraft 100; the engine RPM, engine temperature, main rotor RPM, engine torque, or other rotorcraft system or flight conditions; or according to a predetermined function selected by the pilot. The suggested cyclic stick position is a position determined by flight control computers 216 to give a desired cyclic action. In certain embodiments, flight control computers 216 send a suggested cyclic stick position signal indicating the suggested cyclic stick position to cyclic trim motors 230. While flight control computers 216 may command cyclic trim motors 230 to move cyclic stick 202 to a particular position (which would in turn drive actuators associated with swashplate 116 accordingly), cyclic position sensors 226 detect the actual position of cyclic stick 202 that is set by cyclic trim motors 230 or input by the pilot, allowing the pilot to override the suggested cyclic stick position. Cyclic trim motor 230 is connected to cyclic stick 202 so that the pilot may move cyclic stick 202 while the trim motor is driving cyclic stick 202 to override the suggested cyclic stick position. Thus, in certain embodiments, flight control computers 216 receive a signal from cyclic position sensors 226 indicating the actual cyclic stick position, and do not rely on the suggested cyclic stick position to command swashplate 116.

Similar to cyclic control assembly 203, collective control assembly 208 is connected to a collective trim assembly 232 having one or more collective position sensors 234, one or more collective detent sensors 236, and one or more collective actuators or collective trim motors 238. Collective position sensors 234 measure the position of collective stick 204 in collective control assembly 208. In certain embodiments, collective stick 204 is a single control stick that moves along a single axis or with a lever type action. A collective position sensor 234 detects the position of collective stick 204 and sends a collective position signal to flight control computers 216, which controls engines 112, swashplate actuators, or related flight control devices according to the collective position signal to control the vertical movement of rotorcraft 100. In certain embodiments, flight control computers 216 may send a power command signal to engine control computers 218 and a collective command signal to the main rotor or swashplate actuators so that the angle of attack of the main blades is raised or lowered collectively, and the engine power is set to provide the needed power to keep the main rotor RPM substantially constant.

Collective trim motor 238 is connected to flight control computers 216, and receives signals from flight control computers 216 to move collective stick 204. Similar to the determination of the suggested cyclic stick position, in certain embodiments, flight control computers 216 determine a suggested collective stick position for collective stick 204 according to one or more of the cyclic stick position; the pedal position; the speed, altitude, and attitude of rotorcraft 100; the engine RPM, engine temperature, main rotor RPM, engine torque, or other rotorcraft system conditions or flight conditions; or according to a predetermined function selected by the pilot. Flight control computers 216 generate the suggested collective stick position and send a corresponding suggested collective stick signal to collective trim motors 238 to move collective stick 204 to a particular position. Collective position sensors 234 detect the actual position of collective stick 204 that is set by collective trim motor 238 or input by the pilot, allowing the pilot to override the suggested collective stick position.

Pedal control assembly 212 has one or more pedal sensors 240 that measure the position of pedals 210 or other input elements in the pedal control assembly 212. In certain embodiments, pedal control assembly 212 is free of a trim motor or actuator, and may have a mechanical return element that centers pedals 210 when the pilot releases pedals 210. In other embodiments, pedal control assembly 212 has one or more trim motors that drive a pedal 210 to a suggested pedal position according to a signal from flight control computers 216. Pedal sensors 240 detect the position of pedals 210 and sends a pedal position signal to flight control computers 216, which controls the tail rotor 118 to cause rotorcraft 100 to yaw or rotate around a vertical axis.

Cyclic and collective trim motors 230 and 238 may drive cyclic stick 202 and collective stick 204, respectively, to suggested positions. Cyclic and collective trim motors 230 and 238 may drive cyclic stick 202 and collective stick 204, respectively, to suggested positions, but this movement capability may also be used to provide tactile cueing to a pilot. Cyclic and collective trim motors 230 and 238 may push, respectively, cyclic stick 202 and collective stick 204 in a particular direction when the pilot is moving cyclic stick 202 and collective stick 204, respectively, to indicate a particular condition. Since the FBW system mechanically disconnects cyclic stick 202 and/or collective stick 204 from one or more flight control devices, a pilot may not feel a hard stop, vibration, or other tactile cue that would be inherent in a stick that is mechanically connected to a flight control assembly. In certain embodiments, flight control computers 216 may cause the cyclic and collective trim motors 230 and 238 to push against a pilot command so that the pilot feels a resistive force, or may command one or more friction devices to provide friction felt when the pilot moves the stick (cyclic stick 202 or collective stick 204). Thus, flight control computers 216 control the feel of a stick (cyclic stick 202 or collective stick 204) by providing pressure and/or friction on the stick.

Additionally, cyclic control assembly 203, collective control assembly 208, and/or pedal control assembly 212 each may have one or more detent sensors that determine whether the pilot is handling a particular control device. For example, cyclic control assembly 203 may include cyclic detent sensor 228 that determines whether the pilot is holding cyclic stick 202, while collective control assembly 208 includes collective detent sensor 236 that determines whether the pilot is holding collective stick 204. These detent sensors 228, 236 detect motion and/or position of the respective control stick (cyclic stick 202 or collective stick 204) that is caused by pilot input, as opposed to motion and/or position caused by commands from flight control computers 216, rotorcraft vibration, and the like, and provide feedback signals indicative of such to flight control computers 216. When flight control computers 216 detect that a pilot has control of, or is manipulating, a particular control, flight control computers 216 may determine that stick (cyclic stick 202 or collective stick 204) to be out-of-detent (OOD). Likewise, the FCCs may determine that the stick (cyclic stick 202 or collective stick 204) is in-detent (ID) when the signals from the corresponding detent sensors 228,236 indicate to flight control computers 216 that the pilot has released a particular stick (cyclic stick 202 or collective stick 204). Flight control computers 216 may provide different default control or automated commands to one or more flight systems based on the detent status of a particular stick (cyclic stick 202 or collective stick 204) or pilot control.

As described in greater detail below (see, e.g., FIG. 4 and the corresponding description), portions of flight control system 200, including, for example, flight control computers 216, engine control computers 218, engines 112, and/or instrument panel 222, along with other components of rotorcraft 100, may be configured to operate rotorcraft 100 in an REO flight mode in which at least one of engines 112 is intentionally shut down inflight while at least one other engine 112 is intended to remain active/operational while the at least one engine 112 is the shut-down state. Additionally, as described in greater detail below (see, e.g., FIG. 5 and the corresponding description), rotorcraft 100, including aircraft computer systems 114, may be configured to facilitate an inflight engine auto-restart capability, along with other associated features, such as a backup manual restart capability. Additionally, as described in greater detail below (see, e.g., FIGS. 6-11 and the corresponding description), rotorcraft 100, including aircraft computer systems 114, may be configured to provide certain annunciations in connection with REO flight mode.

Figure 3:
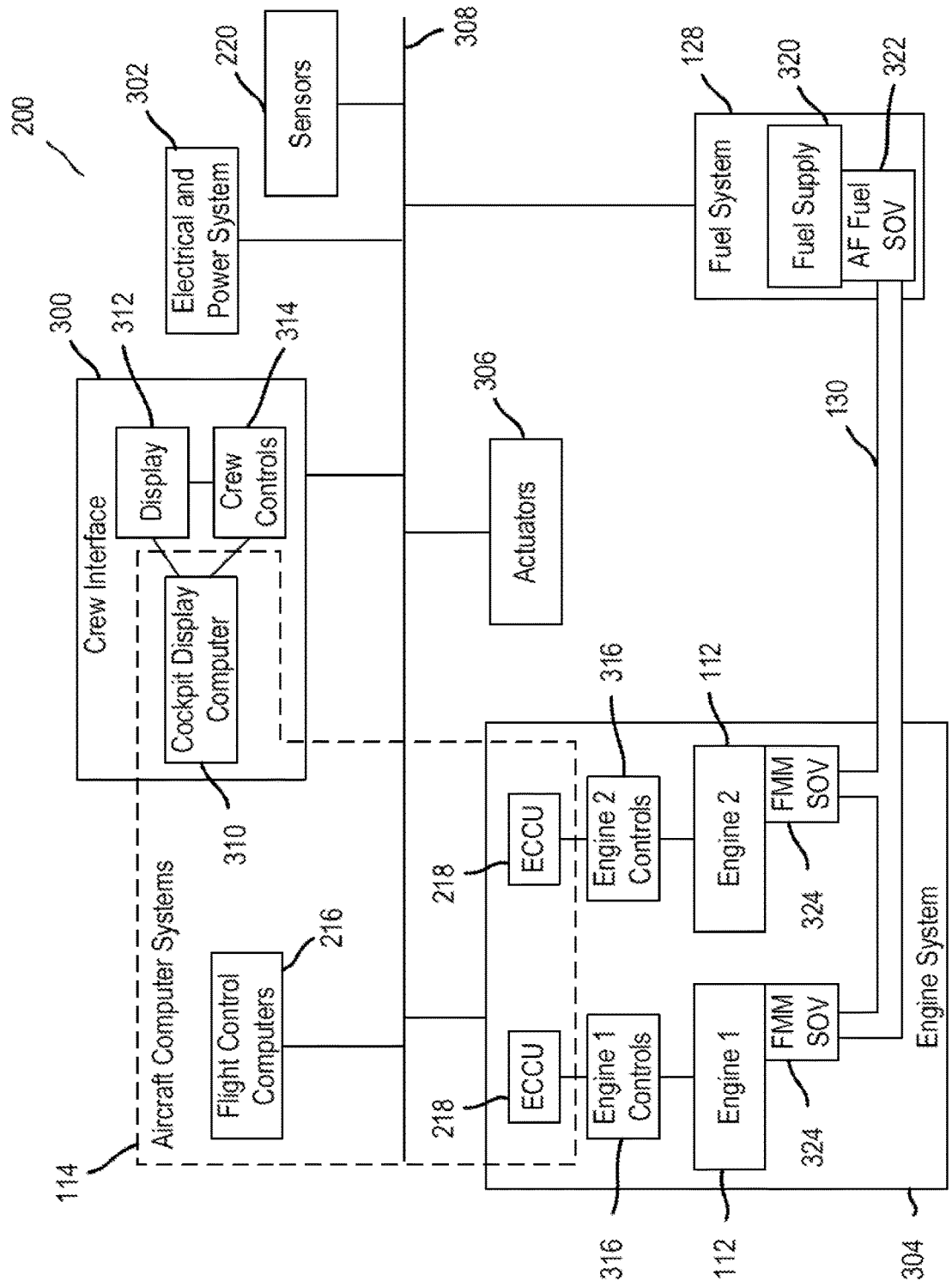
FIG. 3 illustrates another representation of portions of a flight control system for a rotorcraft, according to certain embodiments.

FIG. 3 illustrates another representation of portions of flight control system 200, according to certain embodiments. In the illustrated example of FIG. 3, flight control system 200 includes aircraft computer systems 114, a crew interface 300, electrical and power system 302, sensors 220, engine system 304, fuel system 128, actuators 306, and links 308. Flight control system 200 may include other components in addition to or in place of certain features shown in the representation illustrated of FIG. 3. Furthermore, the components of flight control system 200 may be arranged or combined in other ways, if appropriate.

Crew interface 300 includes a cockpit display computer 310 (sometimes referred to as a cockpit display unit), a display 312, and crew controls 314. Crew interface 300 may be, or may form part of, instrument panel 222 of FIG. 2. Display 312 and crew controls 314 may be implemented using any suitable combination of electronic or mechanical interfaces, such as digital or analog displays, speakers, microphones, dials, knobs, gauges, switches, control sticks (e.g., cyclic stick 202 and collective stick 204), or any other component that provides information to or receives input (e.g., commands) from the crew. Display 312 might or might not be possess touchscreen capabilities. Cockpit display unit 310 may be implemented using any suitable combination of hardware, firmware, and software.

Electrical and power system 302 may include batteries or other power sources, wiring (e.g., one or more electrical buses), safety measure (e.g., circuit breakers), or other elements configured to distribute electrical power to components of flight control system 200 and rotorcraft 100 generally.

Actuators 306 may include any suitable components that facilitate operation of other components of flight control system 200 or other components of rotorcraft 100. For example, actuators 306 may include circuits (e.g., switches, relays, or the like), valves, or other suitable components. Operation of actuators 306 may be controlled by one or more of aircraft computer systems 114 or other suitable components of rotorcraft 100.

Links 308 may represent any suitable combination of power connections, electrical buses, communication links, or that like that may facilitate interaction of components of flight control system 200 with each other or with other elements of rotorcraft 100. Links 308 may be wired or wireless (or a combination), where appropriate.

Fuel system 128 includes fuel supply 320, which may include one or more rigid or flexible fuel tanks, fuel cells, or the like, that are configured to store a suitable fuel for rotorcraft 100. Fuel system 128 may distribute fuel stored in fuel supply 320 to engines 112 via one or more fuel lines 130. Fuel system 128 may include one or more airframe fuel shut-off valves (SOVs) 322. When open, airframe fuel SOVs 322 may allow the distribution of fuel from fuel supply 320 via fuel lines 130. When closed, airframe fuel SOVs 322 may prevent the distribution of fuel from fuel supply 320 via fuel lines 130, potentially stopping the supply of fuel at the source.

Engine system 304 may include multiple engines 112, engine controls 316, and engine control computers 218 (shown as ECCUs). Although shown separately, these components may be combined or separated in any suitable manner. Engine control computers 218 may control operation of, or otherwise interact with, engines 112 via engine controls 316, which may include valves, switches, sensors, engine ignitor, one or more engine-start systems (including a normal (primary) engine-start system and a fast-start engine start system), or other components. Certain embodiments include a distinct engine control computer 218 for each engine 112, while others include one or more engine control computers 218 that can control multiple engines 112.

Engine system 304 may include one or more fuel management module (FMM) SOVs 324 for blocking the supply of fuel from fuel lines 130 to engines 112. In certain embodiments, each engine 112 (e.g., engine 1 and engine 2) includes a corresponding FFM SOV 324 to block the supply of fuel from fuel lines 130 to the corresponding engine 112, such that the blocking of fuel using FMM SOVs 324 is engine-specific. In certain embodiments, an FMM SOV 324 may be closed in the event of a fire on rotorcraft 100 (e.g., by the crew or a suitable computer element activating an engine fire switch, or in another suitable manner).

Some or all of flight control computers 216, engine control computers 218, and cockpit display computer 310 may be considered aircraft computer systems 114.

As described in greater detail below (see, e.g., FIG. 4 and the corresponding description), portions of flight control system 200, including, for example, flight control computers 216, engine control computers 218, engines 112, and/or instrument panel 222, along with other components of rotorcraft 100, may be configured to operate rotorcraft 100 in an REO flight mode in which at least one of engines 112 is intentionally shut down inflight while at least one other engine 112 is intended to remain active/operational while the at least one engine 112 is the shut-down state. Additionally, as described in greater detail below (see, e.g., FIG. 5 and the corresponding description), rotorcraft 100, including aircraft computer systems 114, may be configured to facilitate an inflight engine auto-restart capability, along with other associated features, such as a backup manual restart capability. Additionally, as described in greater detail below (see, e.g., FIGS. 6-11 and the corresponding description), rotorcraft 100, including aircraft computer systems 114, may be configured to provide certain annunciations in connection with REO flight mode.

Although illustrated separately, flight control computers 216, engine control computers 218, and cockpit display computer 310 may be combined or further separated in any suitable manner. Although particular aircraft computer systems 114 are described as performing particular operations, other aircraft computer systems 114 may perform those operations, if appropriate. Aircraft computer systems 114 may include other computer systems. In certain embodiments, some portion or all of aircraft computer systems 114 may be located external to or remotely from rotorcraft 100. In certain embodiments, aircraft computer systems 114 may individually or collectively be implemented using a computer system such as the example described below with reference to FIG. 13.

Figure 4:
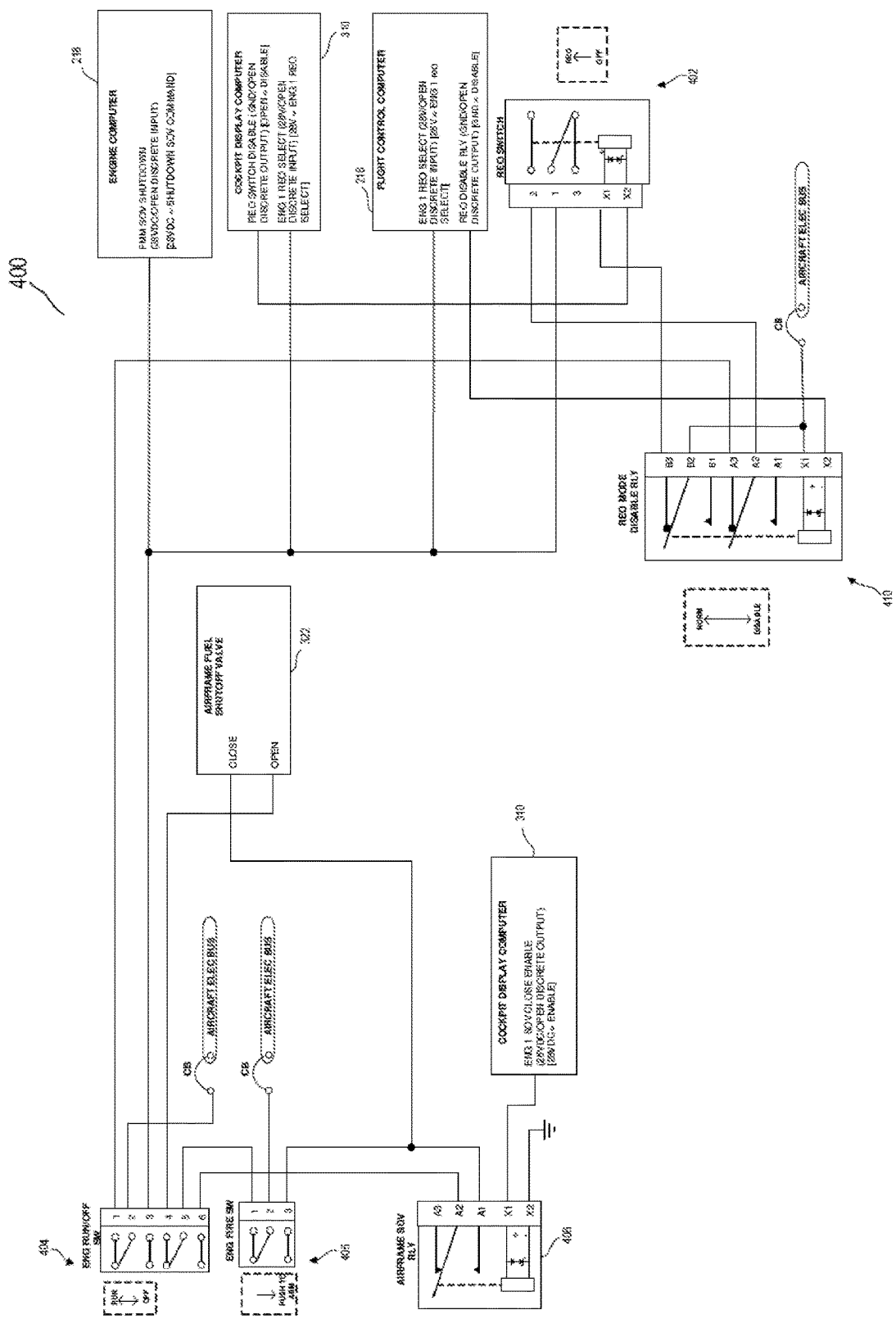
FIG. 4 illustrates a schematic of an example engine shutdown system for a reduced engine operation (REO) flight mode, according to certain embodiments.
Figure 5:
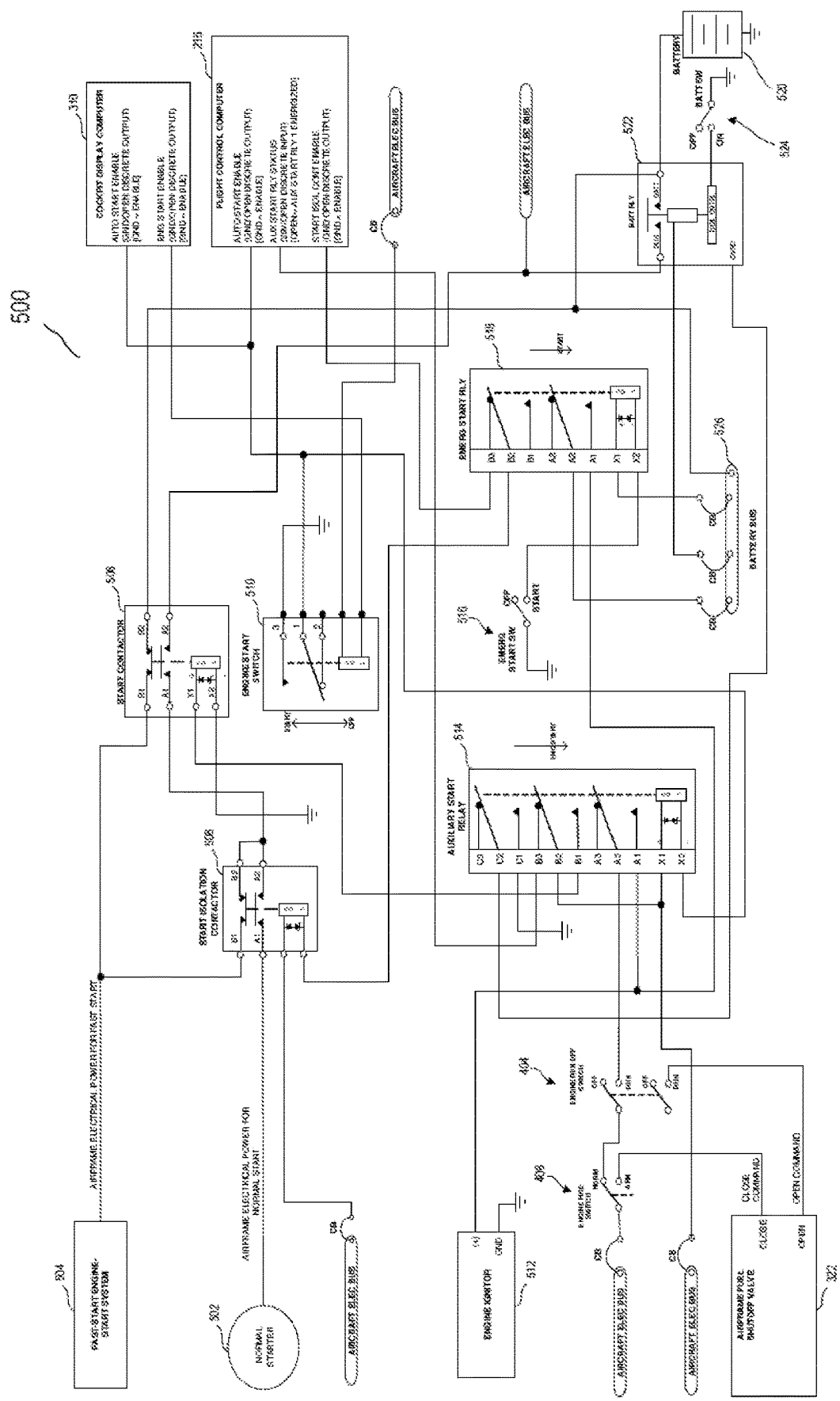
FIG. 5 illustrates a schematic of an example engine restart system for REO flight mode, according to certain embodiments.

FIGS. 4-5 illustrate particular example implementations for providing an engine shutdown for REO flight mode, automatic restart of an engine 112 that has been shut down for REO flight mode, and other associated features. The examples illustrated and described merely provide one example technique for implementing these and other features.

FIG. 4 illustrates a schematic of an example engine shutdown system 400 for REO flight mode, according to certain embodiments. Engine shutdown system 400 may incorporate components of flight control system 200, where appropriate. Engine shutdown system 400 may provide a capability for intentionally shutting down an engine 112 for an REO flight mode in a way that operates outside the normal engine shutdown mechanism and, optionally, allows for a subsequent fast start of the intentionally shut-down engine 112.

Certain embodiments of this disclosure may allow an engine 112 to be intentionally shut down for an REO flight mode with minimal or no interaction with normal engine shutdown switches (e.g., without turning off normal engine on/off switches) and/or with minimal or no throttling (e.g., by the pilot) of the engine to idle, sub-idle, or completely off state. For example, in certain embodiments, the OEC shutdown capability may allow an engine 112 to be shut down for REO flight mode even with the engine throttle in an idle or completely-on state. As a particular example, in certain embodiments of the REO shutdown mechanism, a pilot can leave the throttle in idle (or completely-on) state and shut down the engine for REO mode, allowing the pilot to avoid concern over the throttle position during an emergency restart or other event. Of course, certain embodiments contemplate interacting with the normal engine on/off switch and/or throttle during REO flight mode.

In the illustrated example, engine shutdown system 400 includes engine computer 218, cockpit display computer 310, flight control computer 216, an REO switch 402, an engine run/off switch 404, an engine fire switch 406, airframe fuel SOV 322, an airframe SOV relay (RLY) 408, and an REO mode disable relay (RLY) 410. The components of engine shutdown system 400 may be implemented using any suitable combination of hardware, firmware, and software.

Additionally, as labeled with text throughout FIG. 4, engine shutdown system 400 may include one or more electrical buses, which may be connected to elements of engine shutdown system 400 through one or more circuit breakers (labeled CB). The electrical buses, circuit breakers, and associated electrical connections shown in FIG. 4 may be part of electrical and power system 302 and links 308 of flight control system 200 of FIG. 3.

REO switch 402, which may be referred to as an REO activation switch or REO on/off switch, may provide a dedicated switch for initiating REO flight mode by triggering shutdown of a suitable engine 112. In certain embodiments, REO switch 402 is located in cockpit 125. In certain embodiments, REO switch 402 is a magnetically held switch that is magnetically held to an actuated position and controlled by an aircraft computer system 114 (e.g., cockpit display computer 310 and/or flight control computer 216). For example, REO switch 402 may be moved to an actuated position by a crew member and then magnetically held to the actuated position (or released, where appropriate) by an aircraft computer system 114.

Engine run/off switch 404, which also may be referred to as the primary engine run/off switch or normal engine run/off switch, provides the normal control for starting and shutting down engine 112 when rotorcraft 100 is grounded or in other appropriate situations.

REO switch 402 may provide alternate path to command engine computer 218 to shut down an engine 112 without affecting engine run/off switch 404. In other words, engine shutdown system 400 may be able to shut down an engine 112 for REO flight mode without changing a position of engine run/off switch 404. For example, engine run/off switch 404 may remain in run position for REO flight mode, which is the same position for normal flight with both engines 112 operating. Engine shutdown system 400 may be able to shut down an engine 112 for REO flight mode using a separate engine control (e.g., REO switch 402, which also may be referred to as an REO activation switch) for REO flight mode. For example, movement of REO switch 402 to the actuated (e.g., REO, or ON) position may send an engine shutoff signal to aircraft computer system 114 (e.g., engine control computer 316) and, in response to the engine shutoff signal, aircraft computer system 114 (e.g., engine control computer 316) may command the first engine to shut down.

Engine fire switch 406 may be a switch that can be activated in the event of a fire to block the supply of fuel to the engine 112. In certain embodiments, engine fire switch 406 activates FMM SOV 324 for a corresponding engine 112.

In certain embodiments, shutdown of an engine 112 for REO flight mode may be accomplished by closing FMM SOV 324 and leaving airframe fuel SOV 322 open, which also may facilitate rapid restoration of fuel for re-start, as described in greater detail below in relation to an engine restart feature. For example, in response to the engine shutoff signal, aircraft computer system 114 (e.g., engine control computer 316) may command the first engine to shut down by causing FMM SOV 324 to close to terminate a flow of fuel to engine 112 and thereby shut down engine 112. In certain embodiments, airframe fuel SOV 322 remains open throughout REO flight mode.

Engine shutdown system 400 may include an ability to disable REO flight mode, whether before or after REO flight mode has been initiated. For example, aircraft computer system 114 (e.g., cockpit display computer 310 or flight control computer 216) may disable REO flight mode by deenergizing REO switch 402, thereby terminating sending of engine shutoff signal from REO switch 402 to aircraft computer system 114 and causing aircraft computer system 114 to remove the command to close FMM SOV 324 (thereby opening FMM SOV 324). In certain embodiments, aircraft computer system 114 is operable to prevent REO switch 402 from sending the engine shutoff signal unless preconditions for REO flight mode (preconditions such as airspeed, altitude, two-available engines, etc.) are met. For example, aircraft computer system 114 might be configured to energize, if preconditions for REO flight mode are met, REO switch 402 such that REO flight mode can be engaged. As another example, aircraft computer system 114 might be configured to not energize, if preconditions for REO flight mode are not met, REO switch 402 such that REO flight mode is unable to be engaged using REO switch 402.

In certain embodiments, engine shutdown system 400 includes a backup mechanism for disabling REO fight mode in the event that REO switch 402 is stuck in an on position or otherwise does not disable in response to an attempt by aircraft computer system 114 to deenergize REO switch 402 (e.g., cockpit display computer 310 fails to disable REO switch 402). For example, REO mode disable relay 410 may be controlled by aircraft computer system 114 (e.g., flight control computer 216), which may communicate an REO mode disable signal to REO mode disable relay 410 if REO mode has not been terminated when expected. In response to the REO mode disable signal, REO mode disable relay 410 may be moved from a normal state to a disable state to override REO switch 402 by sending a disable signal to REO switch 402. The disable signal sent by REO mode disable relay 410 may terminate sending of engine shutoff signal from REO switch 402 to aircraft computer system 114 and causing aircraft computer system 114 to remove the command to close FMM SOV 324 (thereby opening FMM SOV 324).

In certain embodiments, REO mode disable relay 410 remains in the disable position throughout a remainder of the flight such that the disable signal continues to be sent to REO switch 402 and REO flight mode is unavailable. This may provide a safety measure until the problem associated with REO switch 402 operation can be investigated and resolved.

Discrete inputs may be provided to aircraft computer systems 114 (e.g., to flight control computer 216 and/or cockpit display computer 310) in connection with REO flight mode, which may trigger aircraft computer systems 114 to perform other operations such as annunciations, auto-restart, or other suitable operations.

FIG. 5 illustrates a schematic of an example engine restart system 500 for REO flight mode, according to certain embodiments. Engine shutdown system 400 may incorporate components of flight control system 200, where appropriate. Engine restart system 500 may provide a capability for automatically-initiating an auto-restart of an engine 112 that has been intentionally shut down for REO flight mode and, optionally, a backup manual restart capability should the auto-restart fail to restart the shut-down engine 112. Furthermore, engine restart system 500 may be combined with engine shutdown system 400 of FIG. 4.

In the illustrated example, engine restart system 500 includes cockpit display computer 310, flight control computer 216, a normal (primary) engine-start system 502, a fast-start engine-start system 504, a start contactor 506, an start isolation contactor 508, an engine start switch 510, an engine ignitor 512, airframe fuel SOV 322, engine fire switch 406, engine run/off switch 404 (e.g., a primary (normal) engine run/off switch), an auxiliary start relay 514, an emergency start switch 516, an emergency start relay 518, a battery 520, a battery relay 522, and a battery switch 524. The components of engine shutdown system 500 may be implemented using any suitable combination of hardware, firmware, and software.

Additionally, as labeled with text throughout FIG. 5, engine restart system 500 may include one or more electrical buses, which may be connected to elements of engine shutdown system 500 through one or more circuit breakers (labeled CB). The electrical buses, circuit breakers, and associated electrical connections shown in FIG. 5 may be part of electrical and power system 302 and links 308 of flight control system 200 of FIG. 3.

Aircraft computer system 114 (e.g., flight control computer 216 and/or cockpit display unit 310) may be operable to detect a failure of the second engine during an REO flight mode in which a first engine 112 has been intentionally shut down inflight and a second engine 112 is to remain operational. Aircraft computer system 114 (e.g., flight control computer 216 and/or cockpit display unit 310) may be operable to automatically initiate, in response to detecting the failure of the second engine 112 during the REO flight mode, an automatic restart of the first engine 112 (e.g., the shut-down engine 112) using fast-start engine-start system 504.

In certain embodiments, to initiate an automatic restart of the first engine 112 (e.g., the shut-down engine 112), engine restart system 500 is operable to automatically restore fuel flow to the first engine 112, and to provide electrical power to fast-start engine-start system 504 and engine ignitor 512.

In certain embodiments, pilot action related to restarting the first engine 112 is avoided during the automatic restart of the first engine 112. For example, in certain embodiments, the automatic restart of the first engine 112 is initiated without the pilot operating engine start switch 510 or engine run/off switch 404. Instead, in certain embodiments, both engine start switch 510 and engine run/off switch 404 remain in their respective dual-engine flight positions (e.g., off for engine start switch 510 and run for engine run/off switch 404).

Thus, in certain embodiments, engine restart system 500 is configured to bypass the normal engine start mechanism (e.g., including engine start switch 510) to initiate an automatic restart of the shut-down engine 112. For example, aircraft computer system 114 (e.g., flight control computer 216 and/or cockpit display computer 310) may bypass engine start switch 510 by activating auxiliary start relay 514, which distributes electrical power from battery 520 to engine ignitor 512 and energizes start contactor 506.

Battery 520 may be any suitable type of power source for providing electrical power to components of rotorcraft 100, such as a nickel-cadmium (Ni—Cd) battery or a lithium-ion (Li-ion) battery. Rotorcraft may include any suitable number of batteries 520 and combinations of different types of batteries. Furthermore, battery 520 may be replaced with or combined with any other suitable type of power source.

Battery relay 522 and battery switch 524 may be used to selectively (e.g., based on an instruction signal from aircraft computer system 114 (e.g., flight control computer 216) or another suitable component) couple charge from battery 520 to battery bus 526, which can then be used to power components of rotorcraft 100 that couple to battery bus 526.

Start contactor 506 may be a two-pole, two-circuit contactor that can complete or break contacts of two separate circuits. The two poles move simultaneously when a contactor coil is energized or deenergized, thereby opening one circuit and closing the other. In the illustrated example of start contactor 506, a first circuit is represented by contacts A1 and A2 and a second circuit is represented by contacts B1 and B2, each of which are described below.

During normal operation, the first circuit of start contactor 506 is open, meaning that start contactor 506 is not energized. This first circuit of start contactor 506 provides electrical power for a normal engine-start system (e.g., normal starter 502 and/or engine start switch 510 and/or engine run/off switch 404) and a fast-start engine-start system 504 through start isolation contactor 508. The first circuit of start contactor 506 may be used to facilitate the auto-restart feature. During normal operation, the second circuit of start contactor 506 is normally closed, meaning that start contactor 506 is not energized. This second circuit of start contactor 506 provides electrical power for direct from the battery bus 526 to fast-start engine-start system 504. The second circuit of start contactor 506 may be used for a backup start feature (described below) if the auto-restart feature fails.

Start isolation contactor 508 may be a two-pole, two-circuit contactor similar to that described above for start contactor 506. Start isolation contactor 508 is operable to electrically isolate normal (primary) engine-start system (e.g., normal starter 502) from fast-start engine-start system 504. In the illustrated example of start isolation contactor 508, a first circuit is represented by contacts A1 and A2 and a second circuit is represented by contacts B1 and B2, each of which are described below.

During normal operation, the first circuit of start isolation contactor 508 is open, meaning that start isolation contactor 508 is not energized. This first circuit of start isolation contactor 508 provides electrical power for a normal engine-start system (e.g., normal starter 502 and/or engine start switch 510 and/or engine run/off switch 404). During normal operation, the second circuit of start isolation contactor 508 is normally closed, meaning that start isolation contactor 508 is not energized. This second circuit of start isolation contactor 508 provides electrical power for fast-start engine-start system 504.

Aircraft computer systems 114 (e.g., flight control computer 216 or cockpit display computer 310) may control start isolation contactor 508. For example, flight control computer 216 may be configured to enable start isolation contactor 508 during a normal start and to not enable start isolation contactor 508 during engine start using fast-start engine-start system 504, such as is the case for automatic restart of the shut-down first engine 112 for REO. In other words, in certain embodiments, flight control computer 216 is configured to enable start isolation contactor 508 during a normal start and to disable start isolation contactor 508 at other times.

Thus, in certain embodiments, during auto-restart of the first engine 112, aircraft computer system 114 (e.g., flight control computer 216 or cockpit display computer 310) energizes start contactor 506 and start isolation contactor 508 remains disabled. Electrical power may be provided to fast-start engine-start system 504 from battery bus 526 via contacts of start contactor 506 and start isolation contactor 508.

Certain embodiments provide a backup manual restart capability to address scenarios in which the auto-restart operation fails to restart the shut-down engine 112. For example, aircraft computer system 114 (e.g., flight control computer 216 and/or cockpit display computer 310) may detect a failure of the automatic restart to start the first engine 112. In response to detecting the failure of the automatic restart to start the first engine 112, aircraft computer system 114 (e.g., flight control computer 216 and/or cockpit display computer 310) may annunciate the failure of the automatic restart, and may attempt, in response to receiving a manual restart activation signal, a manual restart of the first engine 112 using fast-start engine-start system 504. In certain embodiments, the system for providing a backup manual restart of the first engine 112 is independent of the auto-restart system and provides electric power to fast-start engine-start system 504 and to engine ignitor 512 directly from battery 520 via battery bus 526.

To detect a failure of the automatic restart to start the first engine 112, aircraft computer system 114 (e.g., flight control computer 216 and/or cockpit display computer 310) may monitor a status of auxiliary start relay 514. In certain embodiments, aircraft computer system 114 (e.g., flight control computer 216 and/or cockpit display computer 310) may cause display 312 or another suitable element of crew interface 300 (e.g., a speaker) to provide a visual and/or audible annunciation of the failure.

For the backup manual restart system, electrical power may be provided by battery from battery bus 526 using the second circuit (contacts B1 and B2) of start contactor 506. For example, the second circuit (contacts B1 and B2) of start contactor 506 is normally closed. In response to detecting a failure of the automatic restart based on a signal from auxiliary start relay 514, aircraft computer system 114 (e.g., flight control computer 216 and/or cockpit display computer 310) may alert the pilot of the auto restart failure for first engine 112 and alert the pilot to use the emergency start switch 516 to initiate a manual restart of the first engine 112. Start contactor 506 and start isolation contactor 508 may remain de-energized. For example, the first circuits (respective contacts A1 and A2) of start contactor 506 and start isolation contactor 508 may remain open, and the second circuits (respective contacts B1 and B2) of start contactor 506 and start isolation contactor 508 may remain closed, thereby providing an electrical path for providing electrical power from battery 520 via battery bus 526 to fast-start engine-start system 504.

Emergency start relay 518 may be configurable to provide an alternate path for delivering electrical power from battery bus 526 to engine ignitor 512 during a backup manual restart process. This alternative path provided by emergency start relay 518 may be independent of a power-delivery path for the normal start system or the auto-restart system. Emergency start relay 518 may be configurable to disable start isolation contactor 508 for the backup manual restart process, which may inhibit activation of start isolation contactor 508 by aircraft computer system 114 (e.g., flight control computer 216 and/or cockpit display computer 310) during the backup manual restart process. It may be desirable to prevent or otherwise inhibit the ability of start isolation contactor 508 to be energized during the backup manual restart process to avoid normal starter 502 becoming active during the backup manual restart process. Instead, disabling start isolation contractor 508 during the backup manual restart process may isolate normal starter 502 during the backup manual restart process.

Operation of emergency start relay 518 may be controlled by an emergency start switch 516. For example, activation of emergency start switch 516 may send a control signal to emergency start relay 518 to cause emergency start relay 518 to provide a path for delivering electrical power from battery bus 526 to engine ignitor 512. As another example, activation of emergency start switch 516 may send a control signal to emergency start relay 518 to cause emergency start relay 518 to disable start isolation contactor 508 for the backup manual start process.

In certain embodiments, emergency start switch 516 may be operated by the pilot and may be located on cyclic stick 202, collective stick 204, or another location readily accessible to the pilot. Positioning emergency start switch 516 on stick 202 and/or 204 may allow the pilot to operate the manual restart without removing hands from the stick. In certain embodiments, operating emergency start switch 516 presents a single action for the pilot to initiate (or abort) a manual restart of the first engine 112 (following failure of the attempted automatic restart), thereby presenting minimal workload for the pilot through a conveniently-located switch.

In operation, in response to detecting a failure of the automatic restart of the first engine 112, aircraft computer system 114 (e.g., flight control computer 216 and/or cockpit display computer 310) may alert the pilot of the auto restart failure for first engine 112 and alert the pilot to use the emergency start switch 516 to initiate a manual restart of the first engine 112. Start contactor 506 and start isolation contactor 508 may remain de-energized. For example, the first circuit (contacts A1 and A2) of start contactor 506 may remain open, and the second circuit (contacts B1 and B2) of start contactor 506 may remain closed, thereby providing an electrical path for providing electrical power from battery 520 via battery bus 526 to fast-start engine-start system 504. As another example, the first circuit (contacts A1 and A2) of start isolation contactor 508 may remain open, and the second circuit (contacts B1 and B2) of start isolation contactor 508 may remain closed.

Engine restart system 500 is configured to receive manual pilot input through emergency start switch 516. In response to the pilot manually activating emergency start switch 516, emergency start switch 516 may send a control signal to emergency start relay 518 to cause emergency start relay 518 to provide a path for delivering electrical power from battery bus 526 to engine ignitor 512, and may send a control signal to emergency start relay 518 to cause emergency start relay 518 to disable start isolation contactor 508, thereby triggering a manual attempt to restart the first engine 112.

Furthermore, use of a fast-start type engine-start system (e.g., fast-start engine-start system 504) may increase the chances for a relatively rapid restart of first engine 112. A normal starter may work as an electrical generator after starting an engine. In certain embodiments, a fast-start type engine-start system may be implemented as a second electrical starter motor on an engine that is more powerful than a normal motor. The second electrical starter (the starter of the fast-start type engine-start system) might or might not work as an electrical generator after starting the engine. In certain embodiments, the second electrical starter may be implemented as a pneumatic starter whose values are electrically operated.

In certain embodiments, a technique of shutting down first engine 112 described in connection with engine shutdown system 400 of FIG. 4 may provide certain benefits for engine restart system 500 of FIG. 5. As described above, to shut down first engine 112, certain embodiments close FMM SOV 324 and leave airframe fuel SOV 322 open, which may facilitate a rapid restoration of fuel for re-start. FMM SOV 324 may be located closer to first engine 112 than other SOVs (e.g., airframe fuel SOV 322) that could be used to terminate (temporarily in this case) the flow of fuel to first engine 112. For example, airframe SOV 322 may be located proximate fuel supply fuel supply 320, which may be some distance from engines 112, potentially incurring valuable time to restore the flow of fuel to the engine being restarted. On the other hand, FMM SOV 324 may be located proximate the first engine 112, meaning that the supply of fuel can be more quickly restored to the first engine 112.

Furthermore, use of FMM SOV 324 also might not affect a supply of fuel to other engines that remain active (e.g., the second engine 112 that was intended to remain operating during REO flight mode). In certain embodiments, airframe fuel SOV 322 remains open throughout REO flight mode, including during the restart process for restarting the shutdown engine 112.

It should be understood that FIGS. 4-5 illustrate components for one engine 112 of the multiple engines 112. These components may be duplicated or expanded to provide similar operations for additional engines 112 of rotorcraft 100. For example, REO switch 402 may be replicated for a second engine 112 (or potentially more than once when rotorcraft includes more than two engines 112). Additionally or alternatively, additional poles may be added to REO switch 402 for each additional engine 112. As another example, additional engine control computers 218 may be included for additional engines 112.

As described above, certain embodiments of this disclosure provide a crew alerting system that provides visual and/or audio annunciations associated with REO flight mode. The display may provide visual indications related to REO flight mode availability, engine status, engine warnings, and the like. The alerting messages may involve advisory and status messages to create situational awareness of the aircraft associated with REO flight mode. The alerting messages also may include warning and caution messages to alert the pilot to take actions to recover from an unsafe condition resulting from failures (e.g., engine failure, engine restart failure, and failure to disengage REO flight mode when appropriate) in connection with REO flight mode.

Certain embodiments provide indications sufficient to provide a pilot with situational awareness for safely flying the rotorcraft in connection with REO flight mode while reducing or minimizing distractions to the pilot, such as indications that might suggest a problem exists with a powered-down engine when the powered-down engine actually was intentionally shut down as part of REO flight mode. Certain embodiments reduce information overload, reduce potential confusion, and provide an intuitive display associated with REO flight mode. For example, rather than treating REO flight mode as an undesirable, abnormal condition, certain embodiments treat REO flight mode as a normal condition while still providing suitable indications to the crew.

Certain embodiments provide one or more of the following features: recognize (and display) the availability and engagement of REO flight mode, indicate the engine to be shut down for REO flight mode, distinguish between an engine failure and REO shutdown, alert the pilot to restart dormant engine if running engine fails during REO flight mode, and alert the pilot to restart dormant engine when transitioning from a cruise phase in REO flight mode to a descent phase.

FIGS. 6-11 illustrate operation of a power situation indicator (PSI) during various flight conditions. Although a crew alerting system is shown to be implemented as part of a PSI, this disclosure contemplates implementing the crew alerting system in other suitable manner, such as using other types of displays. Additionally, although embodiments are described with respect to a display that provides certain information arranged in a particular way and indicated using certain phrases or coloring, it will be understood that this disclosure is not limited to these examples. For purposes of FIGS. 6-11, it will be assumed that the REO flight mode is an OEC flight mode, and particular visual indications are shown according to this assumption (using "OEC" rather than "REO"). Of course, this disclosure contemplates annunciations being adjusted to accommodate any suitable REO flight mode.

Figure 6:
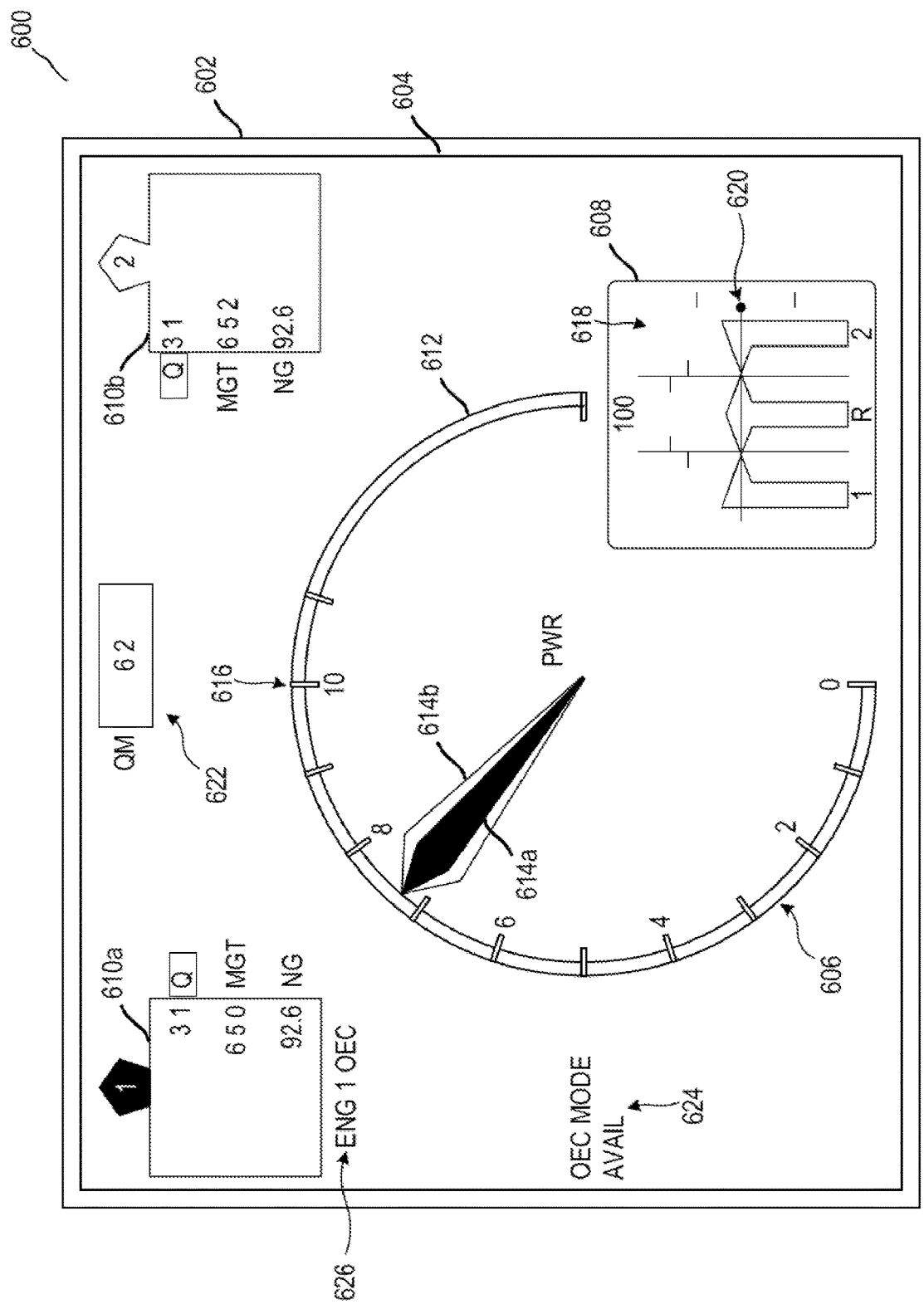
FIG. 6 illustrates an example power situation indicator (PSI) of a rotorcraft in a state in which one-engine cruise (OEC) mode is available, according to certain embodiments.

FIG. 6 illustrates an example power situation indicator (PSI) 600 of a rotorcraft (e.g., rotorcraft 100) in a state in which OEC mode is available, according to certain embodiments. PSI 600 may be configured to provide power indication as a function of flight conditions. Examples of flight conditions for a twin-engine rotorcraft may include the all-engine operative flight mode (AEO), one-engine inoperative flight mode (OEI), non-governing modes (including preflight, run-up and shutdown), autorotation, and OEC mode.

AEO is a flight mode in which all engines are operating and provide power, as appropriate, for driving main rotor system 102 and/or tail rotor system 118. OEI is a flight mode in which, for a two-engine aircraft, one of the engines is not operating, typically due to a problem with that engine, while the other engine remains operational. OEI is considered an abnormal flight condition, and systems of helicopters respond accordingly through warnings, alarms, and the like. Non-governing modes generally refer to modes generally refer to modes prior to or following flight. Autorotation generally refers to a state in which main rotor system 102 and/or tail rotor system 118 are not powered by an engine (e.g., due to engine failure, a change of modes, or for other reasons), and instead rotor blades 104 turn due to interaction of blades (main rotor blades 104a and/or tail rotor blades 104b) with air. OEC has been described previously.

PSI 600 may provide, for example, rotor and power turbine (RPM) information, engine torque ($Q_E$), mast torque ($Q_M$), measured gas turbine temperature (MGT), and gas turbine speed ($N_G$).

RPM information is provided by the power turbine speed of the engine (conventionally referred to as $N_p$ or $N_2$) and the main rotor speed (Nr). In flight, with engines operating, these speeds are typically governed to a predetermined RPM or a range of RPMs. The primary aim of the indicating system for RPM is to assure that rotor and power turbine speeds are maintained at the governing speed by the correct application of engine power. The parameters $Q_E$, MGT, $N_G$, and $Q_M$, relate to restrictions on the amount of engine power that can be delivered into the rotorcraft rotor system. Each of the power parameters ($Q_E$, MGT, $N_G$, and $Q_M$) is typically limited to a maximum value and one or more time-limited ranges. Examples of these include a 5-minute range (typically for take-off), a 30-minute range, a 2-minute range, and a 30-second range (typically for OEI operation). The maximum value that a parameter may attain without entering any of these time-limited ranges may be referred to as the "Maximum Continuous Power" or MCP limit.

The parameter $Q_E$ is the power measured coming out of the engine shaft. The parameter $Q_M$ is the power measured at the transmission shaft driving the main rotor. In many twin engine helicopters, the mast torque is not measured, and limitations are all expressed in terms of engine torque. In these cases, the parameter Q is equivalent to $Q_E$. When mast torque is measured, it is closely related to the sum of engine torques. The difference between the summed engine torques and the mast torque corresponds to the power provided to, for example, the tail rotor, the hydraulic pumps and other transmission-driven accessories. This difference also accounts for transmission losses. In this case, an algorithm is applied to the difference between the mast torque and the summed engine torques. When the mast torque is the restricting parameter, which may be the case for twin engine rotorcraft with all engines operational, this difference is divided proportionally among the engine torque values and applied as a correction. The resulting Q value used by PSI 600 may be slightly less than the measured $Q_E$ such that it reaches the Q parameter limit at the contribution point equivalent to the mast torque limit.

PSI 600 may be part of instrument panel 222 (see FIG. 2) and/or crew interface 300 (FIG. 3). PSI includes a display unit 602. In certain embodiments, PSI 600 includes or is otherwise in communication with sensors that are configured to detect various parameters and a calculation unit configured to process data provided by the sensors. The various parameters detected by the sensors may include the various parameters described above (e.g., Np, Nr, $Q_E$, $Q_M$, MGT and $N_G$). Display unit 602 includes a screen 604 and may be configured to display the data processed by the calculation unit in a specific manner based on the flight modes/conditions of the rotorcraft (e.g., rotorcraft 100).

Display unit 602 includes a power indication area 606, a rotor situation area 608 and a digital readouts areas 610 (610a and 610b).

Power indication area 606 includes a power gauge 612, which in the illustrated example is in round-dial format, that indicates the power available at a glance. An indicating needle 614a, 614b is provided for each engine. In the illustrated example, engine 1 is the solid needle 614a, and engine 2 is the hollow needle 614b. Power gauge 612 is constructed and arranged to provide a combined indication of MGT, $N_G$, $Q_E$, and $Q_M$ in such a way that the relationship between these parameters and several operating limits is indicated via a single indicating needle.

The numbers 1 through 10 shown on power gauge 612 are non-dimensional and are provided for reference only. The indication shown by each needle 614a,614b is a derived indication based on MGT, $N_G$ and Q. Each parameter is normalized against the scale of the power gauge 612 or common power scale such that the maximum continuous power (MCP) occurs at "10," and idle on a standard day occurs at "3." The MCP point will be referred to as the MCP limit 616 of power gauge 612. The position of needle 614a,614b is driven by the parameter with the highest value on the normalized power gauge 612—which is the first parameter likely to reach MCP limit 616 (or the one furthest past MCP limit 616). Conversion to the normalized scale is done in piece-wise linear fashion, so that various engine characteristics and parameter non-linearities can easily be corrected.

Rotor situation area 608 is configured to indicate the rotor speed of the rotorcraft (e.g., rotorcraft 100). In certain embodiments, the format of the rotor situation area changes based on the flight conditions (e.g., normal flight, autorotation, start up, and faulty conditions).

FIG. 6 shows rotor situation area 608 during normal flight conditions, according to certain embodiments. During normal flight conditions, the rotor situation area 608 may be displayed within PSI 600 and includes a bar-graph indicator 618 (or common rotor scale) that provides indication about the power turbine speed (Np) of each engine, the main rotor speed (Nr) and the governor engine reference speed (Nref). Nr, Nref and Np may be scaled in percentage based on Nr. The engine governor is configured to keep the rotor speed (Nr) equal to the selected value of the governor engine reference speed (Nref) by controlling the engine power turbine speed (Np). The typical optimum rotor speed, which is also the normal governing speed, is typically defined as 100%. Modern helicopters, however, often vary the governing speed to optimize performance in accordance with flight conditions. In these cases the governing speed may vary some percentage above or below the 100% mark. The maximum and minimum values of this variability are referred to as the MAX ref and min REF values, indicated by the top and bottom hash marks, respectively, on the right side of rotor situation area 608.

During normal flight conditions, bar-graph indicator 618 (or common rotor scale) is displayed inset in PSI 600 and includes a first turbine gauge (marked "1") that represents the power turbine speed (Np) of the first engine 1 and a second turbine gauge (marked "2") that represents the power turbine speed (Np) of the second engine 2. Bar-graph indicator 618 also includes a third rotor gauge (marked "R") positioned between the first and second turbine gauges and that represents the main rotor speed (Nr). The range of bar graph indicator 618 may be limited specifically to the range from the minimum allowed powered rotor speed to a margin beyond the limits of rotor and power turbine speed, which may provide maximum display resolution for the range of interest during normal, powered flight.

The first turbine gauge CO includes a turbine limit indicated by a short hash mark to the left of bar-graph indicator 618, and the second turbine gauge ("2") includes a turbine limit indicated by a short hash mark to the left of bar-graph indicator 618. Similarly, the third rotor gauge ("R") includes a rotor limit indicated by two short has marks within the middle column of bar-graph indicator 618. These limits represent the maximum acceptable limits for the engine power turbine speed (Np) of the first and second engines and the rotor speed. In certain embodiments, the first and second turbine limits may be set to 104.5% and the rotor limit may be set to 107%.

Bar-graph indicator 618 includes a first pointer in the left-hand portion of bar-graph indicator 618, a second pointer in the right-hand portion of bar-graph indicator 618, and a third pointer in the middle portion of bar-graph indicator 618. The first and second pointers are configured to indicate the engine power turbine speed (Np) of the first and second engines, respectively, and the third pointer is configured to indicate the main rotor speed (Nr). Each pointer of the bar format consists of a filler bar that extends from the bottom of the vertical bar to the height corresponding to the Np and Nr values.

Bar-graph indicator 618 also includes a horizontal bar 620 (referred to as Nref bar 620) that represents the governor engine reference speed (Nref). Nref bar 620 passes across all three of the first, second, and third pointers and is marked to the right by a filled circle. In certain embodiments, a color of Nref bar 620 indicates whether the Nref value is automatically set to the current value, or manually set to the current value. As just an example, automatic determination of Nref according to airspeed and altitude may be indicated by magenta coloring of the bar and filled circle, while selection to a fixed manual value may be indicated by cyan coloring of the bar and filled circle. During normal flight conditions, the governor engine reference speed (Nref) is at a position between the MAX ref and min REF values, indicated by the top and bottom hash marks, respectively, on the right side of rotor situation area 608, and levels of the first, second and third pointers match, as shown in FIG. 6.

Rotor situation area 608 also displays the main rotor speed ($N_R$), shown as the value "100" in the illustrated example. The $N_R$ value may be displayed in relatively large text and may be colored based on flight conditions. When appropriate, values for engine power turbine speed ($N_p$) for the first and second engines may be displayed adjacent to the $N_R$ value (to the left for engine 1 and to the right for engine 2). In certain embodiments, when matched with $N_R$ (e.g., within 0.3 to 0.5%), the $N_P$ values may be suppressed. When unmatched, $N_P$ values may be displayed in small text (e.g., in green) aligned under above the first and/or the second turbine gauge.

In certain embodiments, various colors may be used to display information in bar-graph indicator 618. For example, the first and second turbine gauges, the third rotor gauge, $N_R/N_P$ values may be colored green during normal flight conditions. However, if flight conditions change, other colors may be used for the $N_R$ values: (a) red, if above limit; or (b) yellow, if less than minimum powered droop point (which may be a calculated value based on the number of operational engines and the governor point).

Similarly, when the flight conditions change, the following colors may be used for the power turbine gauges and the $N_P$ values, if displayed: (a) red bar with large digits (smaller than $N_R$ but larger than the green digits) if above limit, or if a clutch or shaft fails (e.g., $N_P > N_R + 0.5\%$ for $> \frac{1}{4}$ second), or if a high-side failure occurs ($N_P > N_{REF} + 0.5\%$ for $> \frac{1}{4}$ second); (b) yellow bar, when matched with rotor indication that is yellow (below min droop), gray triangles replacing the digits remain gray in this case, (c) gray bar with gray digits during OEI.

Turning now digital readouts areas 610 of PSI 600, digital readouts areas 610 include a first engine digital display 610a and a second digital display 61a that provide values of selected parameters for the first and second engines, respectively. Each engine box includes a torque (Q), MGT, and gas turbine speed ($N_G$) readout. $N_G$ is in percent RPM, and MGT is in degrees centigrade.

The first engine digital display 610a and the second digital display 61a include a flag at the top of the box that is in the format of the needle shown in the power indication area: engine 1 has a solid pointer; engine 2 has a hollow pointer. The first and second engine digital displays 610a, 610b include, respectively, a box around a particular parameter label. In the illustrated example, for each of the first and second engine digital displays 610a, 610b, the box is around parameter "Q." The box indicates the parameter that drives the needle position on power gauge 612. In certain embodiments, the digital readouts and box colorings change according to certain ranges of operation.

In the illustrated example, the digital readouts area of PSI 600 also includes a $Q_M$ indicator 622, showing the value of $Q_M$.

In certain embodiments, PSI 600 is configured to display certain indicators to indicate the status of the engine, flight conditions, and/or mode availability.

For example, the flag "ENG OUT" appears at the base of the digital display 610a when an engine-out condition occurs for engine 1 and at the base of digital display 610b when an engine-out condition occurs for engine 2. An OEI flag appears inside power gauge 612 when an OEI condition occurs (which includes an inflight engine-out condition or when an intentional roll-back of an engine throttle is performed). When OEI training is active, the "OEI" flag may be replaced by "TRNG."

A timer may appear in the power gauge for time-limited zones. The timer shown may include a label (e.g., 2 MIN) and a time value shown in minutes and seconds. The timer decrements while in the zone to 0:00, at which point the timer value and label change to red, and a master caution tone may be triggered. A master caution tone may be triggered any time the 2-minute or 30-second zone of the gauge is entered.

In addition, when a parameter approaches its limit, the needles, digital read-outs, and associated timer label and value may flash (e.g., at a rate of 2 Hz with 60% duty cycle). This may apply to: (a) time-limited zones with less than ten seconds remaining or (a) a transient operation above the limit.

Moreover, in an embodiment, the power available needle for an engine in manual full authority digital engine control (FADEC) mode may appear in cyan as opposed to green. In addition, when the speed of rotor RPM is between the max rotor RPM for rotor brake application and 20% (cut out), and is decreasing, the annunciation "RTR BRK" may appear to indicate that the rotor brake can be applied.

FIG. 6 illustrates a state in which PSI 600 displays in display unit 602 on screen 604 an OEC-available indicator 624 (e.g., "OEC MODE AVAIL"). In other words, OEC-available indicator 624 may indicate to the pilot that the preconditions for entering OEC mode have been met, and that OEC mode can be engaged if desired. In certain embodiments, aircraft computer system 114 (e.g., flight control computer 216) determines availability of the OEC mode and, if appropriate, causes PSI 600 to display that OEC mode is available (e.g., using OEC-available indication 624).

Additionally, PSI 600 may display an OEC engine indicator 626, which indicates the engine for shutting down during OEC mode. In the illustrated example, OEC engine indicator 626 indicates engine 1 for shutting down during OEC mode, using the indicator "ENG 1 OEC" displayed under digital readout area 610a for engine 1. In another example, OEC engine indicator may indicate engine 2 for shutting down during OEC, using a similar indicator "ENG 2 OEC" displayed under digital readout area 610b for engine 2. In certain embodiments, aircraft computer system 114 (e.g., flight control computer 216) determines which engine to suggest for shutting down during OEC mode (using an OEC engine indicator 626), and that determination could be based on any suitable combination of a preprogrammed priority, status of engines 1 and 2, or any other suitable information. For example, the identification of which engine to shut down during OEC mode may be based on engine health, a shut-down patter (e.g., alternating which engine is shut down during OEC mode, if possible), and/or according to other suitable factors. In certain embodiments, OEC-available indicator 624 and OEC engine indicator 626 are displayed in white at the state illustrated in FIG. 6.

Figure 7:
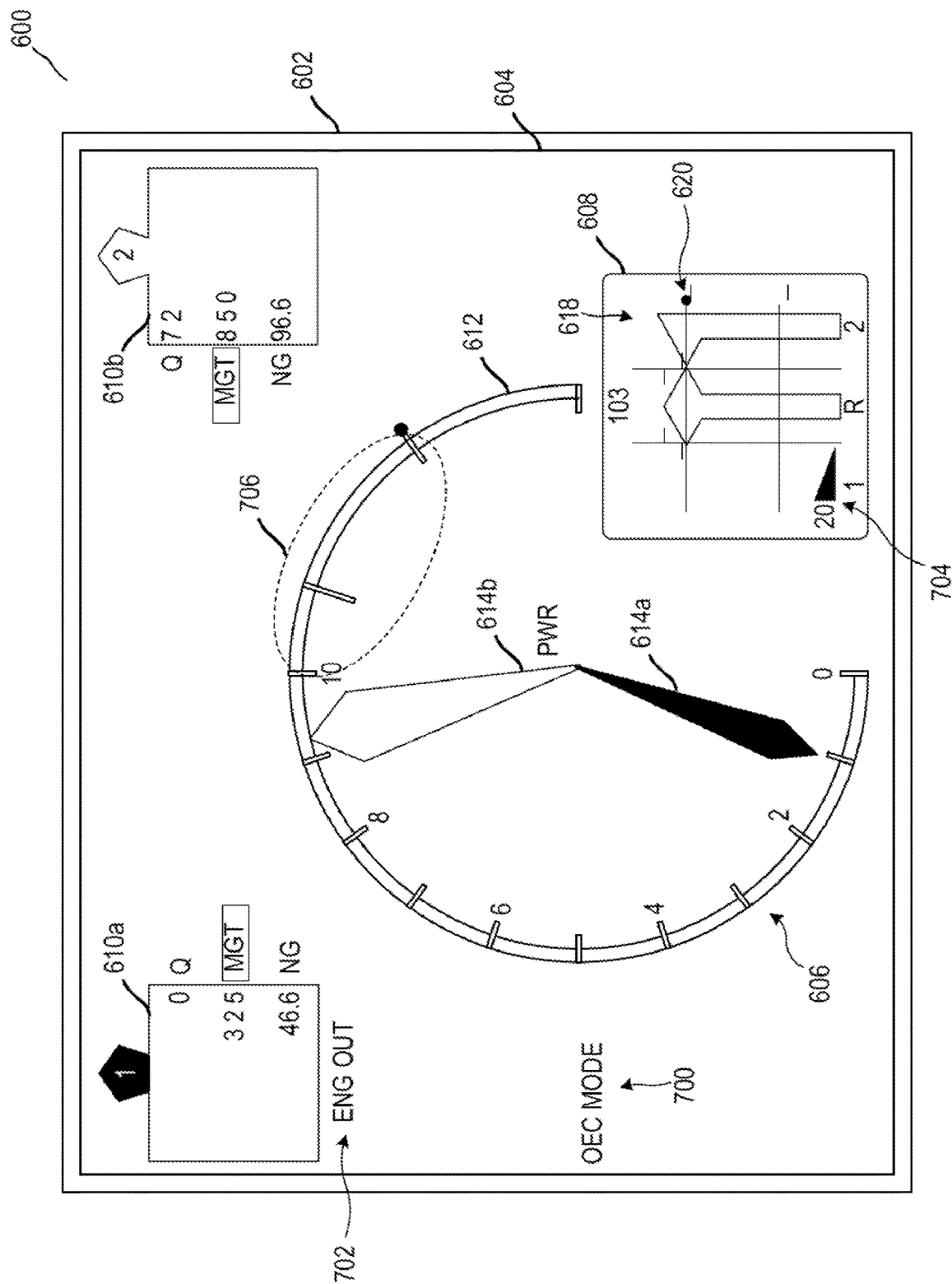
FIG. 7 illustrates an example PSI of a rotorcraft in a state in which OEC mode is engaged, according to certain embodiments.

FIG. 7 illustrates an example PSI 600 of a rotorcraft (e.g., rotorcraft 100) in a state in which OEC mode is engaged, according to certain embodiments. In other words, one of engines 1 and 2 has been shut down, while the other engine remains operational. In the illustrated example, during this instance of OEC mode, engine 1 has been shut down while engine 2 remains operational.

PSI 600 includes various features to indicate the OEC-mode-engaged state and associated information.

For example, rather than displaying OEC-available indicator 624 (e.g., "OEC MODE AVAIL"), PSI boo now displays OEC-engaged indicator 700 (e.g., "OEC MODE"). In certain embodiments, OEC-engaged indicator 700 may be colored green to further indicate that OEC mode is engaged, whereas OEC-available indicator 624 may have been colored a different color, such as white. Additionally or alternatively, the text of OEC-engaged indicator 700 could read "OEC MODE ACTIVE" or the like.

As another example, first engine digital display 610a (and/or the values therein) and needle 614a (e.g., corresponding to engine 1) may be displayed in grey (e.g., in a color that is different than a color (e.g., green) of the needle 614b (e.g., corresponding to engine 2) for the operating engine to indicate which engine has been shut down. Because engine 2 remains active in the OEC-engaged state illustrated in FIG. 7, the values in second engine digital display 610b and needle 614b (e.g., corresponding to engine 2) may be displayed in green or another suitable color for the operating engine to indicate which that engine 2 remains operating.

As another example, an engine-out indicator 702 (e.g., "ENGINE OUT") may be displayed in the area under the digital display 610 of the shut-down engine (e.g., under first engine digital display 610a). In certain embodiments, engine-out indicator 702 may be displayed in a same color as first engine digital display 610a (e.g., grey). In certain embodiments, a manner of displaying engine-out indicator 702 (e.g., a color used for engine-out indicator 702) is distinguishable from a manner (e.g., a color) used for an engine failure indicator, to reduce potential confusion for the crew.

As another example, within bar-graph indicator 618, the first pointer in the left-hand portion of bar-graph indicator 618 corresponding to engine 1 has been lowered such that only a top portion of the pointer is visible (and potentially shaded a color indicating inactive, such as grey), while the second pointer in the right-hand portion of bar-graph indicator 618 (for engine 2) and the third pointer in the middle portion of bar-graph indicator 618 remain. Within bar-graph indicator 618, the pointer for engine 1 may be dropped to the bottom, and possibly colored in grey or otherwise in the same color as the associated indicators (e.g., engine-out indicator 702 and the values in first engine digital display 610a) for engine 1.

Furthermore, in certain embodiments, despite an engine being shut down with OEC now engaged, OEI indications may be suppressed in PSI 600 during the OEC-engaged state illustrated in FIG. 7. For example, when OEC mode is active and engine parameters (e.g., Q, MGT, and $N_G$) are within an OEC envelope, OEI indications may be suppressed. Suppressing the OEI indications may reduce distractions to the pilot, as OEI indications suggest that a problem exists. On the contrary, in OEC-engaged mode, an engine is intentionally shut down, and thus while PSI 600 displays certain indicators to make the pilot aware of the OEC-enabled state is engaged, PSI 600 presents the OEC-enabled state as an expected, acceptable state.

In certain embodiments, certain time-limited power markings may be displayed. For example, such time-limited power markings may be displayed on power gauge 612. In the illustrated example, segment 706 of power gauge 612 may be colored differently (e.g., in yellow) than other portions of power gauge 612 (e.g., in green) to indicate the timer.

Figure 8:
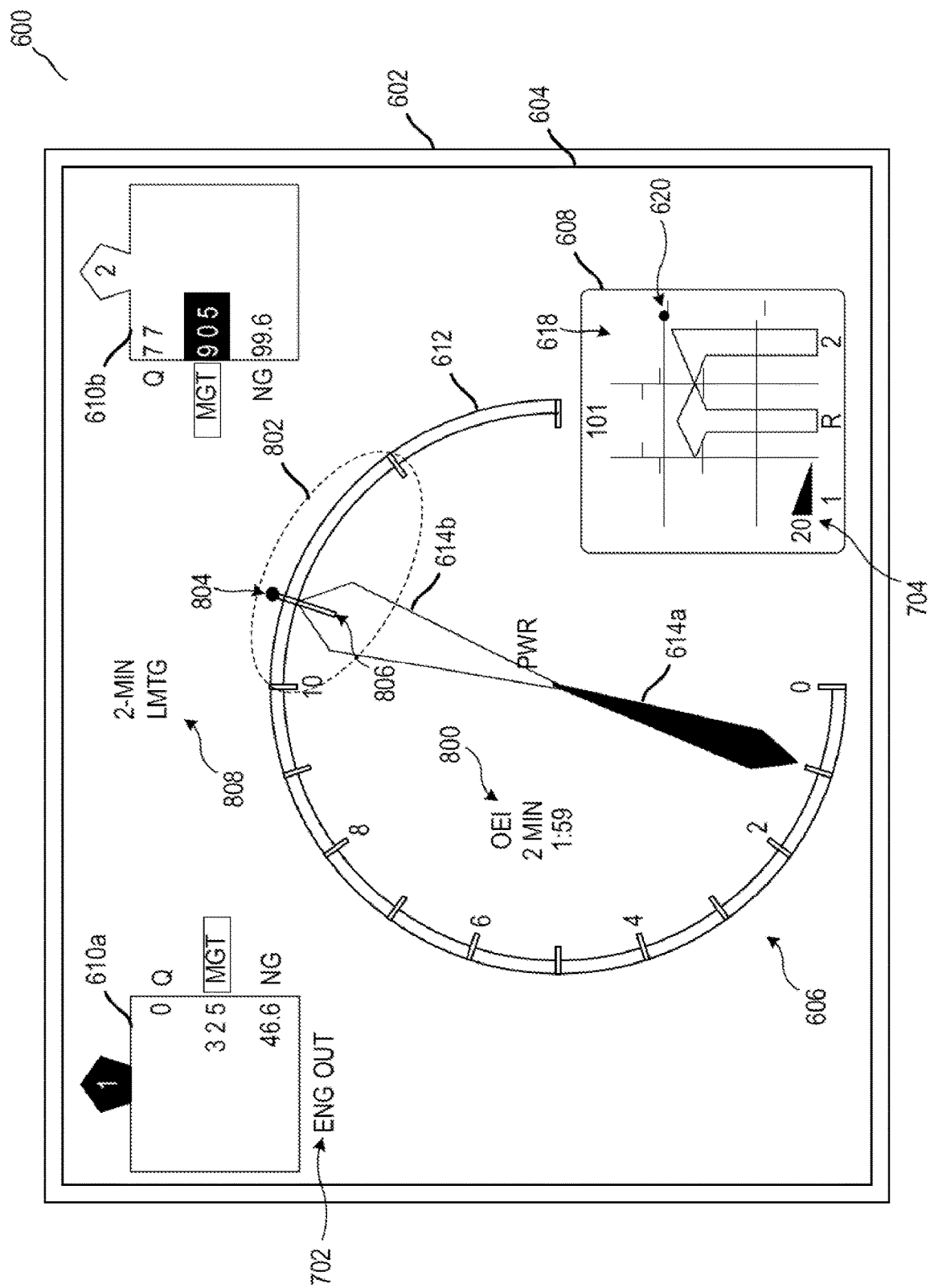
FIG. 8 illustrates an example PSI of a rotorcraft in a state in which OEC mode is disengaged, according to certain embodiments.

FIG. 8 illustrates an example PSI 600 of a rotorcraft (e.g., rotorcraft boo) in a state in which OEC mode is disengaged, according to certain embodiments. The OEC mode may have been disengaged due to pilot action (e.g., restart of the previously shut-down engine, which is engine 1 in the illustrated example), automatically when engine parameters (e.g., Q, MGT, and N G) move outside the OEC envelope, or for another suitable reason. With OEC mode now disengaged, one engine (e.g., engine 1) remains shut down while another engine (e.g., engine 2) remains operational.

With OEC mode now disengaged, PSI 600 may include various features to indicate the OEC-mode-disengaged state and associated information.

For example, both OEC-available indicator 624 (e.g., "OEC MODE AVAIL") and OEC-engaged indicator 700 (e.g., "OEC MODE") may be removed from PSI 600.

As another example, first engine digital display 610*a* (and/or the values therein) and needle 614*a* (e.g., corresponding to engine 1) may continue to be displayed in grey (e.g., in a color that is different than a color (e.g., green) of the needle 614*b* (e.g., corresponding to engine 2) for the operating engine to indicate which engine has been shut down. Additionally because engine 2 remains active in the OEC-disengaged state illustrated in FIG. 8, the values in second engine digital display 61*a* and needle 614*b* (e.g., corresponding to engine 2) may be displayed in green or another suitable color for the operating engine to indicate which that engine 2 remains operating.

As another example, engine-out indicator 702 (e.g., "ENGINE OUT") may continue to be displayed in the area under the digital display 610 of the shut-down engine (e.g., under first engine digital display 610*a*), and may continue to be displayed in a same color as first engine digital display 610*a* (e.g., grey). This provides a continued indication that engine 1 is the engine that is shut down.

As another example, within bar-graph indicator 618, the first pointer in the left-hand portion of bar-graph indicator 618 corresponding to engine 1 remains removed and indicator 704 remains.

As another example, now that an engine (engine 1) is inoperative with OEC disengaged, OEI indications 800 may be displayed in PSI 600 during the OEC-disengaged state illustrated in FIG. 8. In the OEI mode, the inoperative engine needle and digital readouts may be displayed in grey (i.e., in a color that is different from that of the operating engine needle). The needle position for the inoperative engine (e.g., needle 614*a* for engine 1) will typically be very low on the scale of power gauge 612, leaving the moving needle (e.g., needle 614*b*) corresponding to the remaining, active engine (e.g., engine 2) to move around power gauge 612.

For the OEI mode, power gauge 612 operates in the same way as in an AEO mode. Namely, the angle position of needles 614*a*,614*b* for each engine is determined by processing the values of Q, $N_G$, and MGT in accordance with a normalization procedure. In certain embodiments, three timers per parameter (9 timers total—3 parameters) may be used in the OEI mode: a 30 second OEI timer, a 2 minute OEI timer, and a 30 minute OEI timer corresponding to each of the time-limited operating ranges. Each timer may be defined by its active range of parameter values. Each timer may be triggered when the governing parameter is within that range. For purposes of this example, OEI indications 800 include a 2-minute timer, shown as both a time total (2 MIN) to indicate which timer is active, and a countdown clock in minute:seconds form, if appropriate, that decrements in real time until reaching zero. Upon reaching zero, each timer is expired and will remain fixed at zero until reset.

In certain embodiments, in addition to certain range markings (e.g., along segment 802 of power gauge 612) in OEI, the power indication area 606 includes a movable limit represented by tick mark 804, which resides outside power gauge 612. The moveable limit and tick mark 804 indicate the setting for automatic limiting provided by the full authority digital engine control (FADEC). FADEC is an electronic system that is used to control an engine. FADEC is configured to (a) govern the engine to a particular speed by controlling the fuel supply and (b) provide automatic limiting to prevent the engine from exceeding its maximum ratings. As another example, an automatic limiting setting indicator 808 (e.g., "2-MIN LMTG) may be displayed. In certain embodiments, a coloring of tick mark 804 (e.g., powder blue) may be the same as a shading of automatic limiting setting indicator 808 (e.g., powder blue).

For example, if the FADEC is set to 2-minute limiting, the moveable limit and tick mark 804 moves to the outside of the double-length (e.g., yellow) radial mark 806 coincident with a limit that defines the end of the 2-minute zone. If the FADEC is in manual mode, or limiting is not active, the moveable limit and tick mark 804 may be suppressed.

In certain embodiments, OEC mode can automatically return if engine parameters return to within the OEC envelope and the aircraft is stabilized in a cruise (e.g., preconditions, such as airspeed, altitude, two-available engines, etc., are met). That is, in a scenario in which the OEC mode was disengaged automatically due to engine parameters moving outside the OEC envelope, the aircraft may return automatically to OEC-engaged mode and PSI 600 may return to a state similar to that described above with reference to FIG. 7. In certain embodiments, the ability of aircraft to return automatically to OEC-engaged mode may be limited by the OEI timer.

Figure 9:
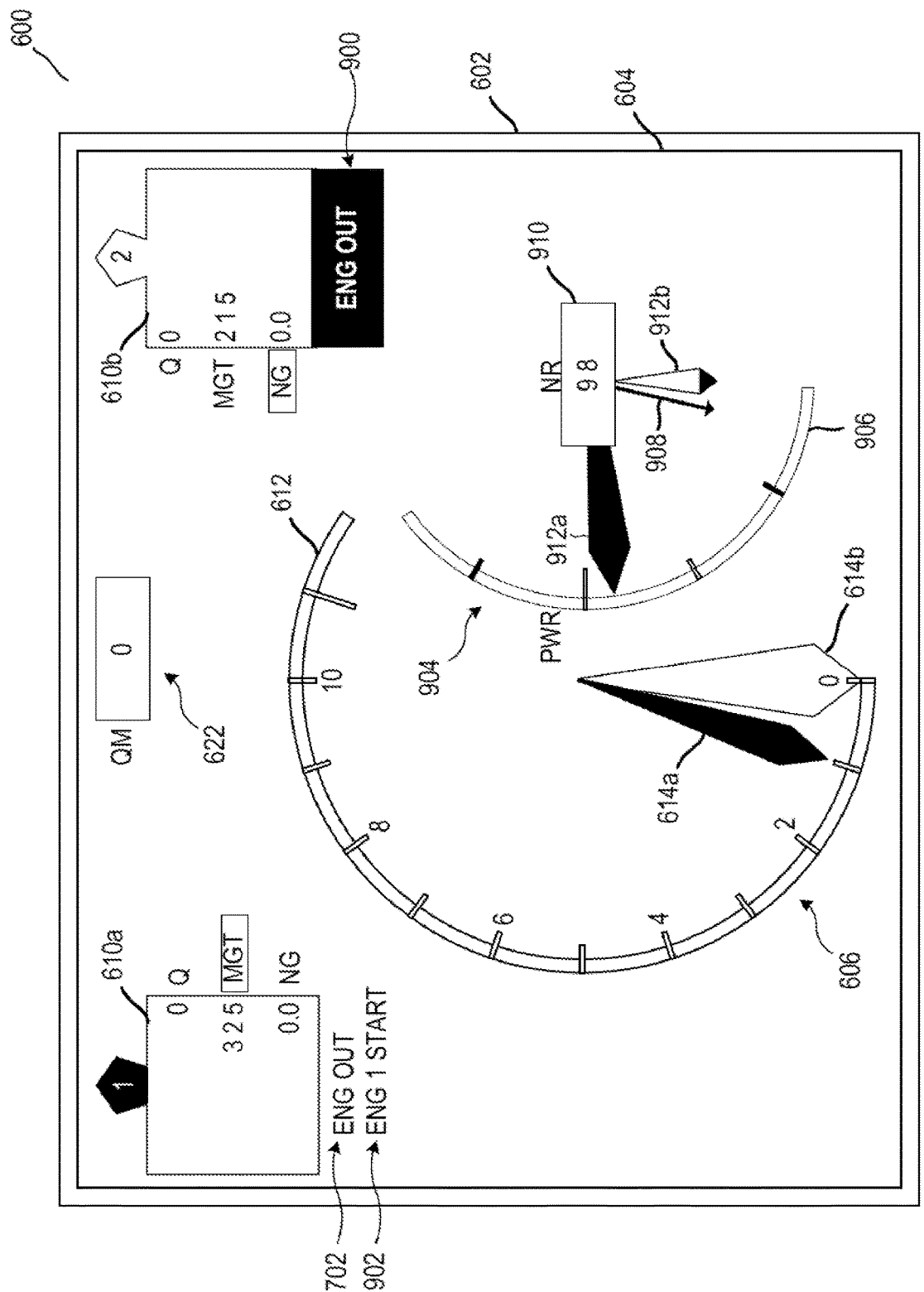
FIG. 9 illustrates an example PSI of a rotorcraft in a state in which OEC mode is engaged and the remaining operating engine has failed, according to certain embodiments.

FIG. 9 illustrates an example PSI 600 of a rotorcraft (e.g., rotorcraft 100) in a state in which OEC mode is engaged and the remaining operating engine has failed, according to certain embodiments. In other words, one of engines 1 and 2 has been shut down (and in the illustrated example, engine 1 has been shut down) as part of OEC mode, while the other engine (engine 2 in this example) was intended to remain operational during OEC mode. Engine 2, however, has failed.

PSI 600 includes various features to indicate the failure of the operational engine during OEC-mode-engaged state and associated information.

For example, first engine digital display 610*a* (and/or the values therein) and needle 614*a* (e.g., corresponding to engine 1) may continue to be displayed in grey to indicate that which engine was shut down for OEC mode. Because intended operational engine 2 has failed in the OEC-engaged state illustrated in FIG. 9, the values in second engine digital display 610*b* and needle 614*b* (e.g., corresponding to engine 2) now also may be displayed in grey to indicate that engine 2 is not operating.

As another example, an engine-out indicator 900 (e.g., "ENGINE OUT") may be displayed in the area under the digital display 610 of the failed engine (e.g., under second engine digital display 610b). In certain embodiments, engine-out indicator 900 may be displayed in red (e.g., a highly-visible red box with the text "ENGINE OUT" in white font) to draw attention to the fact that engine 2 has failed.

As another example, an engine-start indicator 902 (e.g., "ENGINE 1 START") may be displayed in the area under the digital display 610 of the engine that was intentionally shut down for OEC mode (e.g., under first engine digital display 610a) to indicate that a restart of the engine that was intentionally shut down for OEC mode (e.g., engine 1) should initiated. This engine-start indicator 902 may be particular to OEC mode. In certain embodiments, engine-start indicator 902 may be displayed in white.

As another example, a $Q_M$ indicator 622, showing the value of $Q_M$, which in this case is 0.

As another example, an autorotation state may be detected and bar-graph indicator 618 may be replaced by an autorotation indication area 904 that includes a gauge 906. In other words, in response to detecting autorotation, PSI 600 may change the format of rotor situation area 608 from bar-graph indicator 618 to autorotation indication area 904. The format change is intended to provide the pilot with the best possible presentation of rotor RPM when it is most critical. The new presentation of rotor RPM may also be displayed at lower rotor RPM speeds (e.g., at speeds below the vertical scale range). The format change is beneficial for at least the following reasons. First, the pilot becomes accustomed to seeing the format change on a daily basis. Second, if the pilot ignores a powered rotor droop, the change in format further alerts the pilot that attention needs to be paid to the rotor speed.

During autorotation rotor speed $N_R$ may be of heightened importance. For example, it may be desirable to rapidly convey changes in RPM speed as a proportion between over-speed and under-speed conditions. During autorotation the governor reference is not a relevant parameter, and it is desirable to minimize $N_P$ clutter. In certain embodiments, the relevant information is most effectively conveyed as a round dial arc (e.g., gauge 906) with the area of interest (e.g., 80 to 104% in an embodiment) greatly expanded to provide the maximum representation and detectability of trend information.

Autorotation is considered active when the engine is not delivering power to the drive system (e.g., both engine torques $Q_E$ are less than 4%) and when the speed of the rotor $N_R$ exceeds the power turbine speed values $N_P$ of both engines by a margin that indicates the engines are disengaged (e.g., 0.3 to 0.5%). In addition, the speed of the rotor $N_R$ should be greater than the minimum autorotation speed, less a margin (e.g., 75%). In certain embodiments, gauge 906 is displayed when the speed of the rotor is below 90%.

In certain embodiments, gauge 906 is a 125 degree arc that includes multiple segments. Gauge 906 includes a needle 908 that indicates the normalized value of the speed rotor $N_R$. Gauge 906 also includes an $N_R$ indicator 910 that displays the current value of the speed rotor ($N_R$) as digits (98 in the illustrated example). Gauge 906 also includes, for each engine, a respective needle 912a (for engine 1) and 912b (for engine 2) that indicate the current values of the power turbine speed of engines 1 and 2, respectively.

Figure 10:
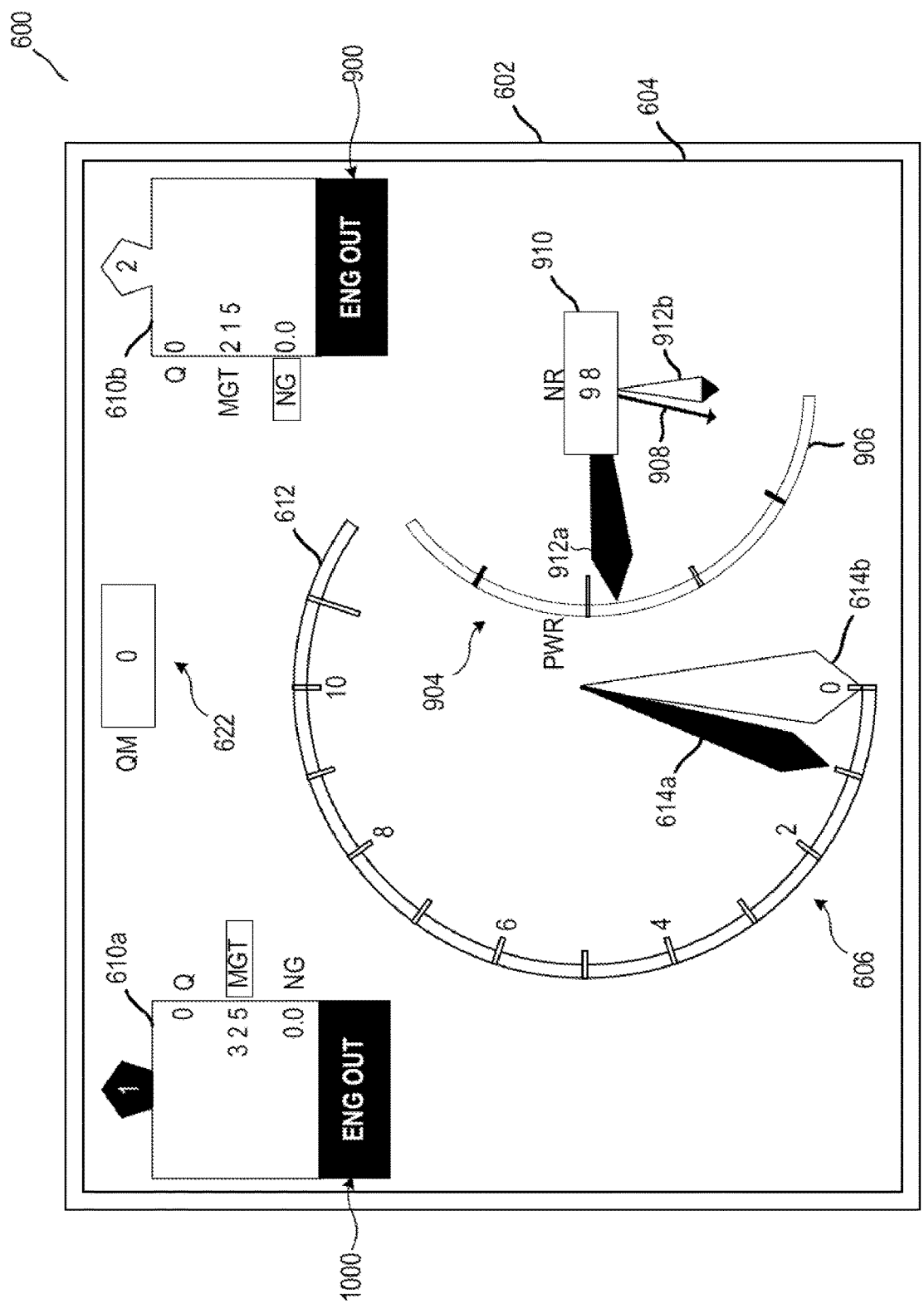
FIG. 10 illustrates an example PSI of a rotorcraft in a state in which OEC mode is engaged and both engines have failed, according to certain embodiments.

FIG. 10 illustrates an example PSI 600 of a rotorcraft (e.g., rotorcraft 100) in a state in which OEC mode is engaged and both engines have failed, according to certain embodiments. In other words, one of engines 1 and 2 was been shut down (and in the illustrated example, engine 1 has been shut down) as part of OEC mode, the other engine (engine 2 in this example) was intended to remain operational during OEC mode but has failed, and an attempted restart (auto or manual) of engine 1 failed. As a particular example, a state of PSI 600 in FIG. 10 may follow a state of PSI 600 in FIG. 9 if an attempt to restart engine 1 following the state of PSI 600 in FIG. 9 fails.

In the illustrated example, to indicate the failed status of engine 1 (noting that engine 2 already shows an engine-out indicator 900), PSI 600 in FIG. 10 has replaced the grey engine-out indicator 702 and the engine-start indicator 902 with an engine-out indicator woo (e.g., "ENGINE OUT") in the area under the digital display 610 of the failed engine (e.g., under first engine digital display 610a). In certain embodiments, engine-out indicator woo may be displayed in red (e.g., a highly-visible red box with the text "ENGINE OUT" in white font) to draw attention to the fact that engine 1 has failed.

In the illustrated example, PSI 600 continues to display autorotation indication area 904 in place of bar-graph indicator 618.

Figure 11:
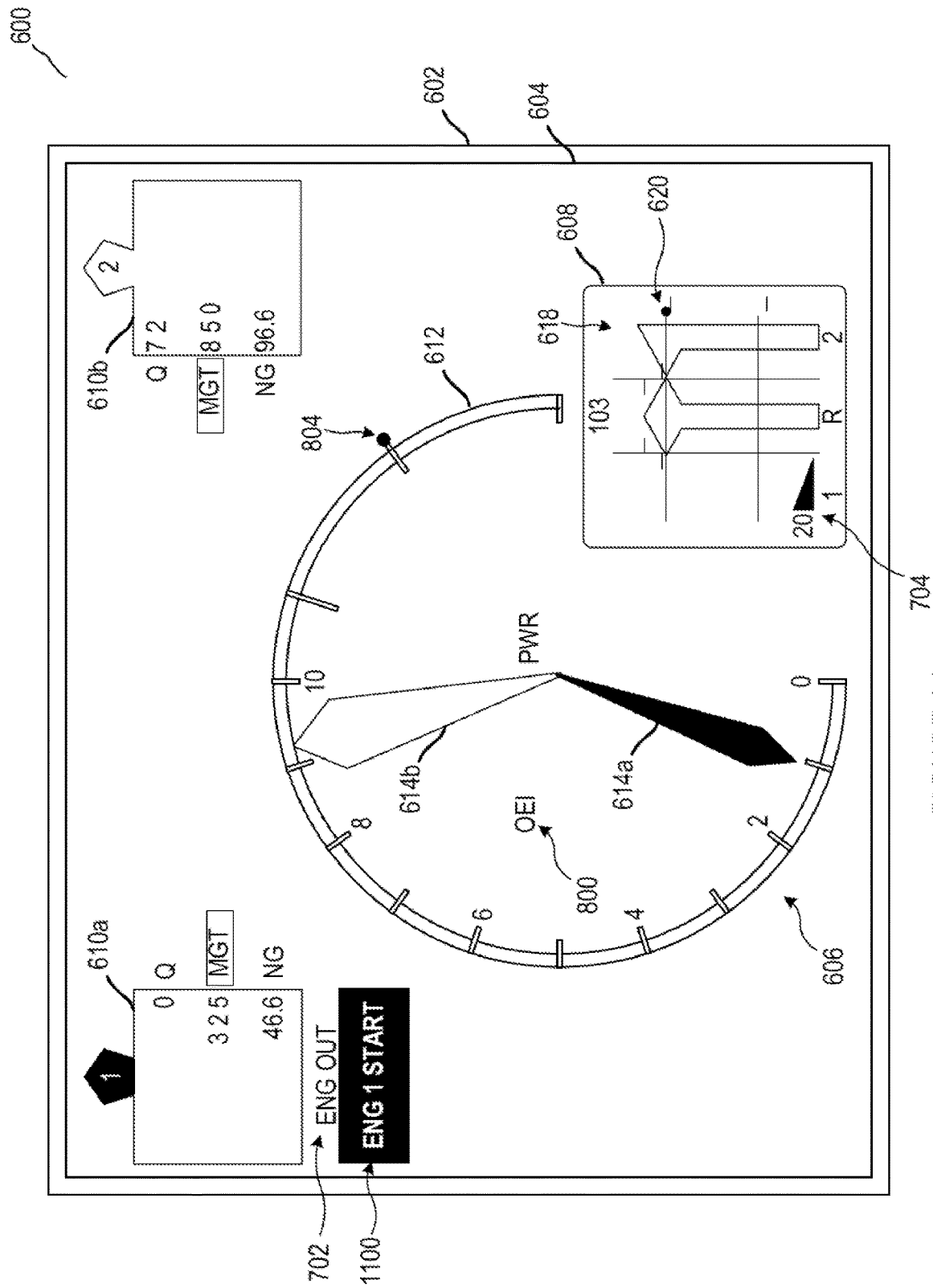
FIG. 11 illustrates an example PSI of a rotorcraft in a state in which OEC mode is engaged and the rotorcraft is transitioning to descent, according to certain embodiments.

FIG. 11 illustrates an example PSI 600 of a rotorcraft (e.g., rotorcraft boo) in a state in which OEC mode is engaged and the rotorcraft is transitioning to descent, according to certain embodiments. In other words, the rotorcraft has returned to a state similar to that shown in connection with FIG. 7 in which engines 1 and 2 are operating as expected in OEC mode but the rotorcraft is transitioning to descent. In certain embodiments, a pilot is required to restart the powered-down engine (e.g., engine 1 in this example) before reaching a particular above-ground level (AGL) (e.g., 2000 feet AGL).

PSI 600 includes various features to remind the pilot to restart the dormant engine (e.g., engine 1 in this example).

For example, rather than displaying OEC-engaged indicator 700 (e.g., "OEC MODE"), PSI 600 now displays OEC-engine-start indicator 1100 (e.g., "ENG 1 START"). OEC-engine-start indicator woo may include an identification of the dormant engine to be started (in this example, engine 1 through the inclusion of "ENG 1"), as well as be positioned under or otherwise adjacent to the engine digital display 610 for that engine (e.g., first engine digital display 610a for engine 1 in this example). In certain embodiments, OEC-engine-start indicator 1100 may be displayed in yellow (e.g., a highly-visible yellow box with the text "ENG 1 START" in black font) to draw attention to the fact that engine 1 should be started.

In certain embodiments, OEC-engine-start indicator 1100 is displayed as a reminder to restart the dormant engine (engine 1) if the dormant engine has not been started at 2500 feet AGL. In some implementations, an audio alert "ENGINE START" also may be played. At and below 2000 feet AGL (or another suitable height), in certain embodiments, OEC-engine-start indicator 1100 may change to a warning if the appropriate engine (engine 1 in this example) has not been started. As a particular example, OEC-engine-start indicator 1100 may change from being displayed in yellow (e.g., a highly-visible yellow box with the text "ENG 1 START" in black font) to being displayed in red (e.g., a highly-visible red box with the text "ENG 1 START" in white font) to emphasize the growing urgency to start the engine (e.g., engine 1). In certain embodiments, if the appropriate engine (engine 1 in this example) has not been started normally at or below 2000 feet AGL, the system may be configured to initiate an automatic restart (e.g., as described herein).

As another example, first engine digital display 610*a* (and/or the values therein) and needle 614*a* (e.g., corresponding to engine 1) may be continue to be displayed in grey (e.g., in a color that is different than a color (e.g., green) of the needle 614*b* (e.g., corresponding to engine 2) for the operating engine) to indicate which engine has been shut down. Because engine 2 remains active in the state illustrated in FIG. 11, the values in second engine digital display 610*b* and needle 614*b* (e.g., corresponding to engine 2) may be displayed in green or another suitable color for the operating engine to indicate which that engine 2 remains operating.

As another example, engine-out indicator 702 (e.g., "ENGINE OUT") may continue to be displayed in the area under the digital display 610 of the shut-down engine (e.g., under first engine digital display 610*a*). In certain embodiments, engine-out indicator 702 continues to be displayed in a same color as first engine digital display 610*a* (e.g., grey).

As another example, within bar-graph indicator 618, the first pointer in the left-hand portion of bar-graph indicator 618 corresponding to engine 1 has been lowered such that only a top portion of the pointer is visible (and potentially shaded a color indicating inactive, such as grey), while the second pointer in the right-hand portion of bar-graph indicator 618 (for engine 2) and the third pointer in the middle portion of bar-graph indicator 618 remain. Within bar-graph indicator 618, the pointer for engine 1 may be dropped to the bottom, and possibly colored in grey or otherwise in the same color as the associated indicators (e.g., engine-out indicator 702 and the values in first engine digital display 610*a*) for engine 1.

As another example, in certain embodiments, while OEI indications are suppressed during OEC mode, OEI indications 800 may return if the dormant engine (e.g., engine 1) is not restarted before starting descent of the rotorcraft.

An example flight may have phases that include a climb phase, a cruise phase, and a descent phase, with a transition-to-cruise occurring between the climb phase and the cruise phase and a transition-to-descent occurring between the cruise phase and the descent phase. A given flight may include multiple climb, cruise, and/or descent phases.

The climb phase may begin after stabilization in a climb and may end when the intended cruising altitude is reached. During a transition to cruise, both engines of the rotorcraft may be operational and operating normally.

The cruise phase may begin when the rotorcraft levels off at an intended cruising altitude and end when the rotorcraft begins a descent with intent to hover or land. In certain embodiments, OEC mode can be activated by shutting down one engine if flight conditions, such as altitude, airspeed, two-available engines, and the like, are appropriate. The shut-down engine may be indicated as off condition (grey text in black background) instead of failure. During normal OEC operation, the operating engine may be operating below OEI MCP. During OEC operation, if the operating engine moves above OEI MCP, OEC mode may be deactivated (e.g., including OEC-engaged indicator 700 disappearing and engine-out indicator 702 remaining grey) and OEI indicators 800 and timers to appear.

In certain embodiments, time limited OEI power (30 sec/2 min) typically is not required in cruise phase. Thirty-second OEI power may be used either to complete a take-off or reject take-off and land. Two-minute OEI power may be used to climb-out clear of obstacles after take-off.

During transition to descent, a restart of the engine shut down for OEC mode may be attempted before reaching 2000 feet AGL. If the engine is not restarted, OEC-engine-start indicator 1100 may be displayed, first in yellow as a caution/reminder at 2500 feet AGL and then in red as a warning at and below 2000 feet AGL. In some implementations, an audio alert "ENGINE START" may be played if the dormant engine is not re-started.

The descent phase may begin when the rotorcraft begins descent with intention to hover or land and ends when altitude is below moo feet AGL. It should be understood that these phases and transitions are described as examples only.

FIG. 12 illustrates a flow diagram of an example method 1200 for inflight REO, engine restart, and associated alerts, according to certain embodiments. Method 1200 may be performed, in whole or in part, by one or more computer systems, and may be embodied, in whole or in part, in a software program stored on a non-transitory computer-readable storage medium that is executed by one or more processors of the one or more computer systems.

For clarity, it will be assumed that method 1200 is being performed in connection with rotorcraft 100 that includes two engines 112, engine 1 (the first engine 112) and engine 2 (the second engine 112), and that when entering REO flight mode, engine 1 will be shut down while engine 2 is intended to remain operational. Of course, the engines could be reversed over different iterations of method 1200, and method 1200 could apply to rotorcraft 100 with more than two engines 112. Furthermore, it will be assumed that rotorcraft 100 already is in flight and has two operational engines 112 actively driving flight of rotorcraft 100, and that rotorcraft includes a fast-start engine-start system 504 for engine 1.

The description of method 1200 includes various references to "updating the display" or the like. It should be understood that this disclosure contemplates annunciating the associated information in any suitable manner, including updating a display, playing an audible message or alarm, or the like, alone or in combination.

At block 1202, aircraft computer systems 114 detect availability of REO flight mode. For example, aircraft computer system 114 may determine that preconditions for REO flight mode (preconditions, such as airspeed, altitude, two-available engines, etc.) are met and based thereon, determine that REO flight mode is available. In a particular example, rotorcraft is in a cruise flight phase, though other possibilities are contemplated.

At block 1202, cockpit display computer 310 displays an REO available status. For example, cockpit display computer 310 may initiate display of OEC-available indicator 624. Having determined which engine 112 is available for shutdown, aircraft computer system 114 (e.g., cockpit display computer 310 and/or flight control computer 216) may cause an REO engine indicator (e.g., OEC engine indicator 626) to be displayed.

At step 1206, aircraft computer system 114 (e.g., cockpit display computer 310 and/or flight control computer 216) receives an engine shutdown command for shutting down engine 1. In certain embodiments, REO on/off switch 402 for engine 1 is moved to an on position (e.g., by a pilot), which causes the engine shutdown command for engine 1 to be sent to and received by aircraft computer system 114 (e.g., cockpit display computer 310 and/or flight control computer 216).

At step 1208, aircraft computer system 114 may initiate a shutdown of engine 1 to enter REO flight mode. In certain embodiments, initiating the shutdown of engine 1 includes bypassing a primary shutdown system for engine 1 and shutting down engine 1 using a secondary shutdown system. In certain embodiments, initiating the shutdown of engine 1 to enter the REO flight mode is performed in response to REO on/off switch 402 for engine 1 being moved to an on position. In certain embodiments, primary run/off switch 404 for engine 1 remains in a run position while engine 1 is shut down during the REO flight mode, REO on/off switch 402 for engine 1 being distinct from primary run/off switch 404 for engine 1.

In certain embodiments, bypassing the primary shutdown system for engine 1 and shutting down engine 1 using a secondary shutdown system includes causing an engine FMM SOV 324 for engine 1 to close to terminate a flow of fuel to engine 1 and thereby shut down engine 1, with airframe fuel SOV 322 remaining open while in the REO flight mode.

In certain embodiments, aircraft computer system 114 (e.g., flight control computer 216 and/or cockpit display computer 310) may cause the REO on/off switch 402 for engine 1 to be held in an on position during REO flight mode.

At step 1210, aircraft computer system 114 (e.g., cockpit display computer 310 and/or flight control computer 216) may cause an indication that REO flight mode is engaged (e.g., OEC-engaged indicator 700 or the like) to be displayed.

At step 1212, detects whether a failure of engine 2 while engine 1 is shut down in REO flight mode. In certain embodiments, aircraft computer system 114 (e.g., engine computer system 218 for engine 2, cockpit display computer 310, and/or flight control computer 216) receives data indicating this failure or otherwise detects that the failure has occurred.

If a failure of engine 2 is detected at step 1212, then method 1200 proceeds to step 1214. At step 1214, aircraft computer system 114 (e.g., cockpit display computer 310 and/or flight control computer 216) may cause an indication that engine 2 has failed (e.g., engine-out indicator 900 for engine 2 or the like) to be displayed.

At step 1216, aircraft computer system 114 automatically initiates, in response to detecting the failure of engine 2 during the REO flight mode, an automatic restart of engine 1 using fast-start engine-start system 504. In certain embodiments, during the automatic restart of engine 1, positions of one or more control components for initiating a start of engine 1 using the primary engine-start system are unaffected by the automatic restart of engine 1 using the fast-start engine-start system 504 for engine 1. For example, the one or more control components for initiating a start of engine 1 using the primary engine-start system may include an engine start switch (e.g., engine run/off switch 404), and automatically initiating, in response to detecting the failure of engine 2 during the REO flight mode, the automatic restart of engine 1 using the fast-start engine-start system 504 may include controlling circuitry to selectively power the fast-start engine-start system 504 rather than the primary engine-start system.

In certain embodiments, the circuitry to selectively power the fast-start engine-start system 504 rather than the primary engine-start system includes an auxiliary start relay 514, a start contactor 506, and a start isolation contactor 508. In such an embodiment, controlling circuitry to selectively power the fast-start engine-start system 504 rather than the primary engine-start system may include controlling (e.g., by aircraft computer system 114 (e.g., flight control computer 216 and/or cockpit display computer 310) auxiliary start relay 514 to energize start contactor 506 to provide electrical power to either the primary engine-start system or the fast-start engine-start system 504, a state of start isolation contactor 508 causing the electrical power to be distributed to the fast-start engine-start system 504 to thereby automatically initiate the automatic restart of engine 1.

At step 1218, aircraft computer system 114 (e.g., flight control computer 216) detects whether the automatic restart of engine 1 at step 1216 was successful.

If aircraft computer system 114 (e.g., flight control computer 216) detects at step 1218 that the automatic restart of engine 1 was successful, then method 1200 may proceed to step 1220. At step 1220, aircraft computer system 114 (e.g., cockpit display computer 310 and/or flight control computer 216) may update the display to reflect that engine 1 has been successfully restarted, such as by removing engine-out indications for engine 1 and returning icons associated with engine 1 to an active color (e.g., green).

At step 1222, with engine 2 out, rotorcraft 100 operates in an OEI mode.

At step 1224, aircraft computer system 114 (e.g., flight control computer 216) determines whether the flight has terminated (e.g., rotorcraft 100 landed). If aircraft computer system 114 (e.g., flight control computer 216) determines at step 1224 that the flight has not terminated, then method 1200 may return to step 1222, for rotorcraft to continue operating in OEI mode. If, on the other hand, aircraft computer system 114 (e.g., flight control computer 216) determines at step 1224 that the flight has terminated, then method 1200 may end.

Returning to step 1218, if aircraft computer system 114 (e.g., flight control computer 216) detects that the automatic restart of engine 1 was not successful (failed), then method 1200 proceeds to step 1226. At step 1226, aircraft computer system 114 (e.g., cockpit display computer 310 and/or flight control computer 216) may update the display to reflect that engine 1 was not successfully restarted (failed), such as by displaying indications that both engine 1 and engine to are out (e.g., as illustrated in FIG. 10 and described above). Aircraft computer system 114 (e.g., cockpit display computer 310 and/or flight control computer 216) may annunciate the failure of the automatic restart in any suitable manner.

At step 1228, aircraft computer system 114 (e.g., flight control computer 216) may receive a manual restart activation signal and attempt, in response to receiving the manual restart activation signal, a manual restart for engine 1. In certain embodiments, aircraft computer system 114 (e.g., flight control computer 216) may attempt, in response to receiving the manual restart activation signal, a manual restart of engine 1 using the fast-start engine-start system 504.

In certain embodiments, a control (e.g., an emergency start switch 516) for initiating the manual restart of engine 1 may be operated by the pilot and may be located on cyclic stick 202, collective stick 204, or another location readily accessible to the pilot.

In certain embodiments, attempting, in response to receiving the manual restart activation signal, includes providing electrical power to fast-start engine-start system 504 from a battery (e.g., battery 520) and providing electrical power to engine ignitor 512 from a battery (e.g., battery 520).

In operation, in response to detecting a failure of the automatic restart of engine 1, aircraft computer system 114 (e.g., flight control computer 216 and/or cockpit display computer 310) may alert the pilot of the auto restart failure for first engine 112 and alert the pilot to use the emergency start switch 516 to initiate a manual restart of the first engine 112 (e.g., at step 1226). Start contactor 506 and start isolation contactor 508 may remain de-energized. For example, the first circuit (contacts A1 and A2) of start contactor 506 may remain open, and the second circuit (contacts B1 and B2) of start contactor 506 may remain closed, thereby providing an electrical path for providing electrical power from battery 520 via battery bus 526 to fast-start engine-start system 504. As another example, the first circuit (contacts A1 and A2) of start isolation contactor 508 may remain open, and the second circuit (contacts B1 and B2) of start isolation contactor 508 may remain closed.

Engine restart system 500 is configured to receive manual pilot input through emergency start switch 516. In response to the pilot manually activating emergency start switch 516, emergency start switch 516 may send a control signal to emergency start relay 518 to cause emergency start relay 518 to provide a path for delivering electrical power from battery bus 526 to engine ignitor 512, and may send a control signal to emergency start relay 518 to cause emergency start relay 518 to disable start isolation contactor 508, thereby triggering a manual attempt to restart engine 1.

At step 1230, aircraft computer system 114 (e.g., flight control computer 216) detects whether the manual restart of engine 1 at step 1228 was successful.

If aircraft computer system 114 (e.g., flight control computer 216) detects at step 1230 that the manual restart of engine 1 was successful, then at step 1232 aircraft computer system 114 (e.g., cockpit display computer 310 and/or flight control computer 216) may update the display to reflect that engine 1 has been successfully restarted, such as by removing engine-out indications for engine 1 and returning icons associated with engine 1 to an active color (e.g., green). The method may then proceed to step 1222 for rotorcraft 100 to operate in OEI mode (as engine 2 has failed), and method 1200 may proceed until termination.

Returning to step 1230, if aircraft computer system 114 (e.g., flight control computer 216) detects at step 1230 that the manual restart of engine 1 was not successful, then method 1200 may proceed to step 1234 in which rotorcraft 100 is in an autorotation state until rotorcraft lands, crashes, or an engine is successfully restarted.

Returning to step 1212, if a failure of engine 2 is not detected at step 1212 (which may simply be the absence of a detection that engine 2 has failed), then method 1200 proceeds to step 1236. At step 1236, aircraft computer system 114 (e.g., flight control computer 216) detects whether REO flight mode has been disengaged. The REO mode may have been disengaged due to pilot action (e.g., restart of engine 1), automatically when engine parameters (e.g., Q, MGT, and $N_G$) move outside the REO envelope, or for another suitable reason.

In certain embodiments, the REO flight mode is disabled in response to detecting that an REO flight mode disabling condition is met. Disabling the REO flight mode may include aircraft computer system 114 (e.g., cockpit display computer 310 and/or flight control computer 216) deenergizing the REO on/off switch 402 that is held in the on position while in the REO flight mode, deenergizing REO on/off switch 402 for engine 1 causing the REO on/off switch 402 for engine 1 to move to an off position and thereby removing a command to engine 1 (e.g., to the engine control computer 316 for engine 1) to shut down engine 1 (e.g., by now removing a command to close FMM SOV 324 for engine 1, thereby opening the FMM SOV 324 for engine 1 and restoring a flow of fuel to engine 1).

In certain embodiments, if aircraft computer system 114 (e.g., cockpit display computer 310 and/or flight control computer 216) detects that an REO flight mode disabling condition is met but that the REO flight mode remains active, then aircraft computer system 114 (e.g., cockpit display computer 310 and/or flight control computer 216) may directly disengage, in response to detecting that the REO flight mode remains active, the REO flight mode using REO mode disable relay 410, as described above.

If a disengagement of REO flight mode is not detected at step 1236, then method 1200 may proceed to step 1242, described below. If a disengagement of REO flight mode is detected at step 1236, then method 1200 may proceed to step 1238.

At step 1238, aircraft computer system 114 (e.g., cockpit display computer 310 and/or flight control computer 216) may update the display to reflect that REO mode is no longer active and method 1200 may proceed to step 1240.

At step 1240, aircraft computer system 114 (e.g., flight control computer 216) detects whether REO flight mode has been reengaged. If aircraft computer system 114 (e.g., flight control computer 216) detects that REO flight mode has not been reengaged (which may be the absence of detecting reengagement), then method 1200 may proceed to step 1250, described below. If aircraft computer system 114 (e.g., flight control computer 216) detects that REO flight mode has been reengaged, then method 1200 may proceed to step 1242.

At step 1242, aircraft computer system 114 (e.g., flight control computer 216) determines whether a descent phase has been detected. If aircraft computer system 114 (e.g., flight control computer 216) determines at step 1242 that a descent phase has not been detected, then method 1200 may return to step 1212. If aircraft computer system 114 (e.g., flight control computer 216) determines at step 1242 that a descent phase has been detected, then method 1200 may proceed to step 1244.

At step 1244, aircraft computer system 114 (e.g., cockpit display computer 310 and/or flight control computer 216) may update the display to reflect that a descent phase has been detected, as described above in connection with FIG. 11.

At step 1246, aircraft computer system 114 (e.g., flight control computer 216) determines whether engine 1 has been restarted. If aircraft computer system 114 (e.g., flight control computer 216) determines at step 1246 that engine 1 has been restarted, then at step 1248, aircraft computer system 114 (e.g., cockpit display computer 310 and/or flight control computer 216) may update the display to reflect that both engines 1 and 2 are now active. At step 1250, aircraft computer system 114 (e.g., flight control computer 216) determines whether the flight has terminated (e.g., rotorcraft 100 landed). If aircraft computer system 114 (e.g., flight control computer 216) determines at step 1250 that the flight has not terminated, then method 1200 may return to step 1250, for ongoing detection of a terminated flight. If, on the other hand, aircraft computer system 114 (e.g., flight control computer 216) determines at step 1250 that the flight has terminated, then method 1200 may end.

Figure 12A:
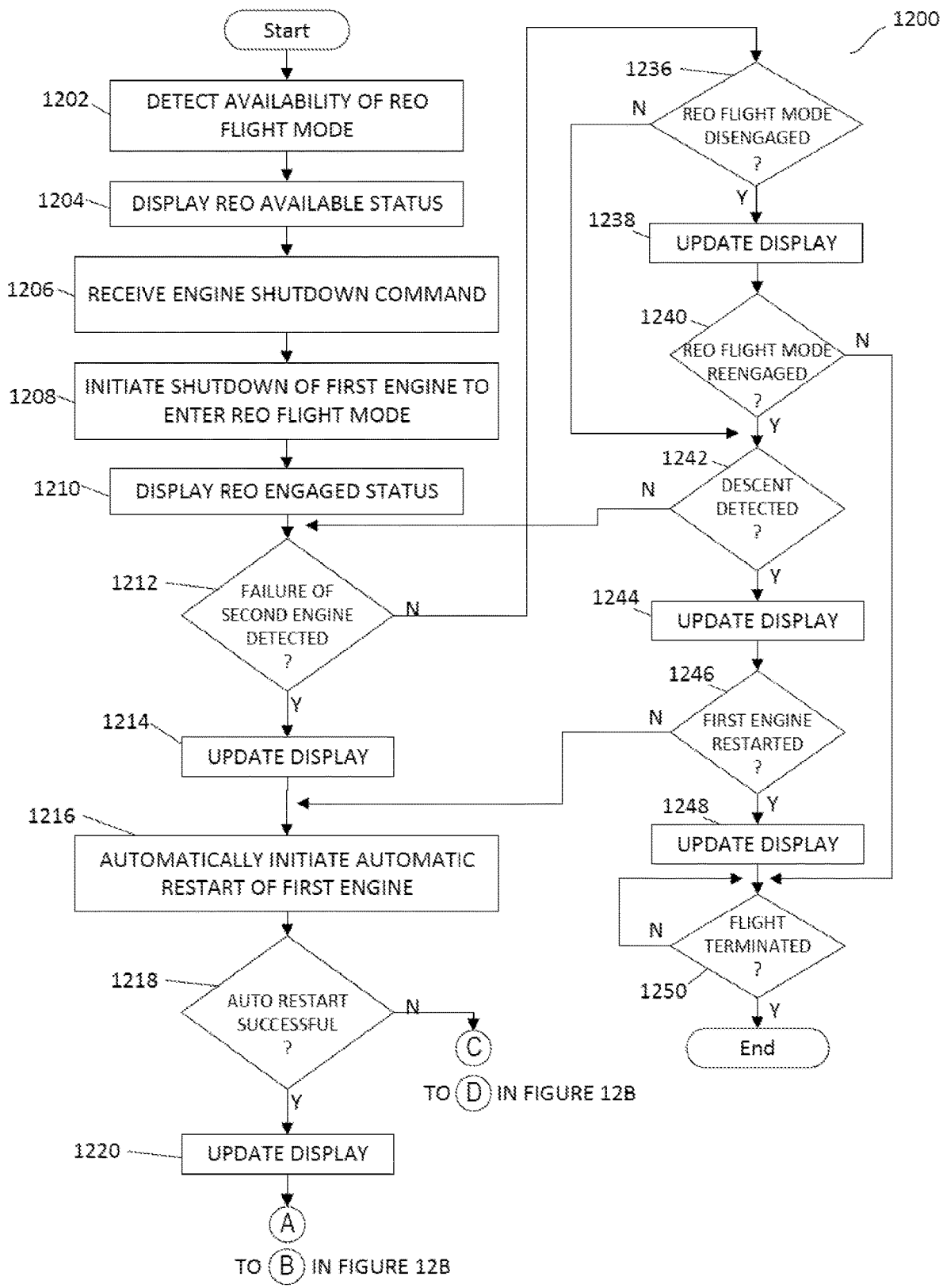
FIGS. 12A-12B illustrate an example process for REO flight mode, according to certain embodiments.
Figure 12B:
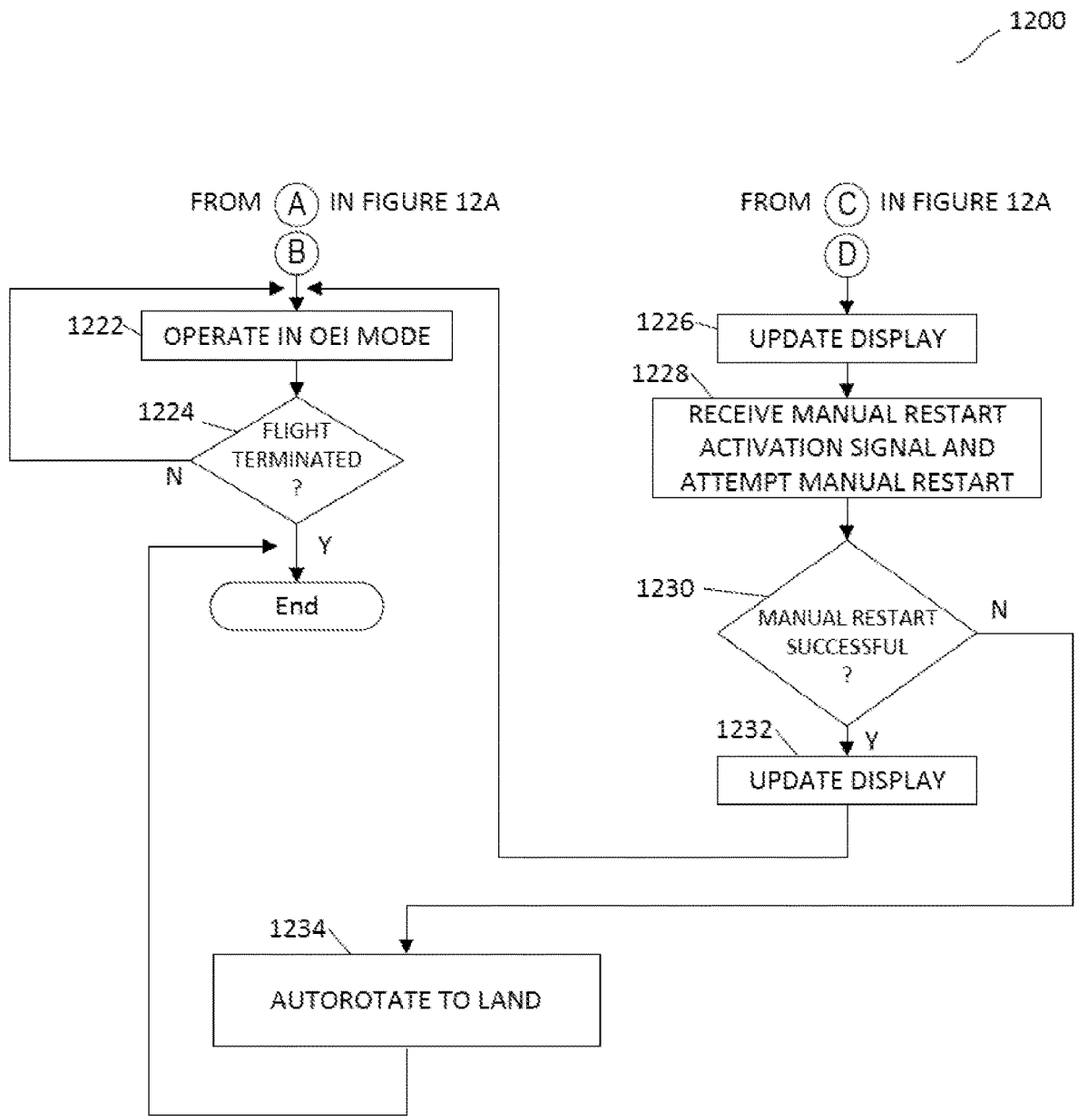

Returning to step 1246, if aircraft computer system 114 (e.g., flight control computer 216) determines at step 1246 that engine 1 has not been restarted, then method 1200 may proceed according to applicable rules, which may vary from aircraft-to-aircraft depending on programming for handling all-engines-out status at low altitude. In certain embodiments, method 1200 may proceed to step 1216, described above, for aircraft computer system 114 to automatically initiate an automatic restart of engine 1 using fast-start engine-start system 504. As a particular example, if the appropriate engine (engine 1 in this example) has not been started normally at or below 2000 feet AGL, aircraft computer system 114 may be configured to automatically initiate an automatic restart of the engine (engine 1 in this example). Method 1200 may proceed following step 1216 as indicated in FIGS. 12A-12B or as otherwise appropriate.

Although this disclosure describes particular process/method acts as occurring in a particular order, this disclosure contemplates the process/method steps occurring in any suitable order and/or simultaneously. Furthermore, this disclosure contemplates omitting certain steps and/or performing additional steps as may be appropriate for a given implementation.

Figure 13:
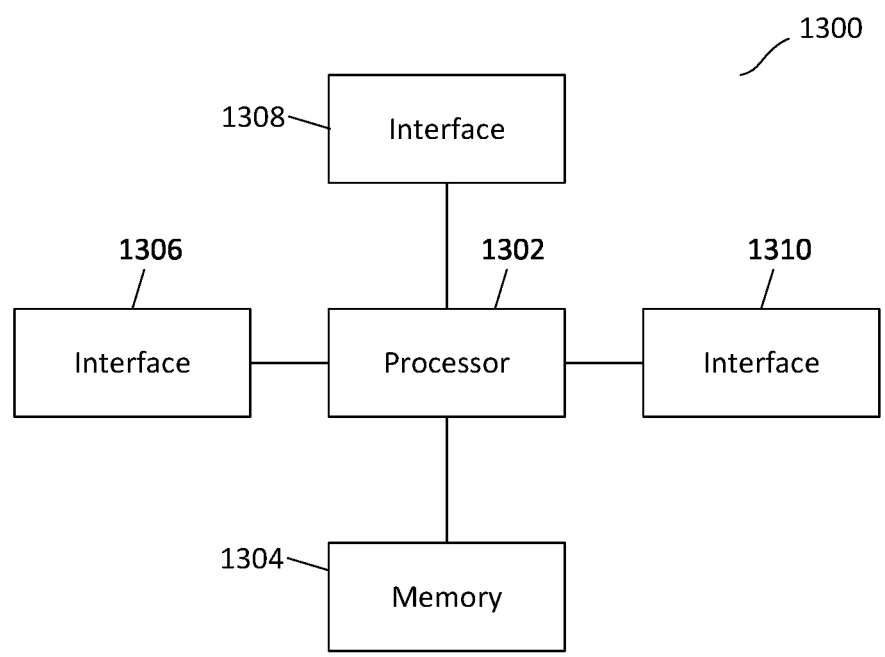
FIG. 13 illustrates a block diagram of an example computer system, according to certain embodiments.

FIG. 13 is a block diagram of an example computer system 1300, according to certain embodiments. Computer system 1300 can be configured to perform one or more operations related to aircraft computer systems 114, including flight control computer 216, engine control computer 218, cockpit display computer 310, and/or other components of flight control system 200, system 400, system 500, or PSI 600, or associated with method 1200. For example, these systems and methods may be implemented using one or more computer systems 1300. Further, any processing and analysis can be partly or fully performed by the computer system 1300. Computer system 1300 can be partly or fully integrated with other aircraft computer systems or can be partly or fully removed from rotorcraft 100.

Computer system 1300 may be implemented using any suitable combination of hardware, firmware, and software. Computer system 1300 includes processor 1302, one or more memories 1304, and interfaces 1306-1310, which may (or may not) be arranged as shown. Computer system 1300 may include any suitable number of processors, memories 1304, and interfaces 1306-1310.

Processor 1302 may be any component or collection of components adapted to perform computations and/or other processing related tasks. Processor 1302 may be a programmable logic device, a microcontroller, a microprocessor, any suitable processing device, or any suitable combination of the preceding.

Memory 1304 may be any component or collection of components adapted to store programming and/or instructions for execution by the processor 1302. Memory 1304 may include any one or a combination of volatile or non-volatile local or remote devices suitable for storing information. For example, memory 1304 may include random access memory ("RAM"), read-only memory ("ROM"), magnetic storage devices, optical storage devices, or any other suitable information storage device or a combination of these devices. Memory 121 may be, in whole or in part, local to or remote from rotorcraft 100. In an embodiment, the memory 1304 includes a non-transitory computer-readable medium. Memory 1304 may store one or more computer programs for execution by processor 1302, the one or more computer programs includes instructions for performing operations and that when executed by the process cause the process to perform those operations.

Interfaces 1306, 1308, 1310 may be any component or collection of components that allow aircraft computer systems 114 to communicate with other devices/components and/or a user. For example, one or more of the interfaces 1306, 1308, 1310 may be adapted to communicate data, control, or management messages from the processor 1302 to applications installed on the host device and/or a remote device. As another example, one or more of the interfaces 1306, 1308, 1310 may be adapted to allow a user or user device (e.g., personal computer (PC), etc.) to interact/communicate with aircraft computer systems 114. Aircraft computer systems 114 may include additional components not depicted, such as long term storage (e.g., non-volatile memory, etc.).

Embodiments of this disclosure may provide none, some, or all of the following technical advantages. Furthermore, other advantages may be described in or understood from this disclosure.

Certain embodiments provide a dedicated REO control switch (potentially one for each engine) that may be engaged to shut down an engine and enter REO flight mode, without changing the position of normal engine control switches used for start and shutdown on the ground. This feature may reduce the potential for inflight pilot confusion regarding the status of the engines and the particular flight mode that is engaged.

Certain embodiments provide for automatic restart, in response to appropriate conditions (e.g., failure of an engine that was intended to remain operative during REO flight mode), of an engine that has been shutdown for REO flight mode. The automatic nature of the restart may reduce crew workload at a time when the crew's attention may be better directed at other tasks, such as flying the aircraft without power being provided to the rotors. In other words, certain embodiments increase safety by allowing the crew to safely manage autorotation without requiring a manually restart an engine that was shut down for REO flight mode.

In certain embodiments, little to no pilot action is required to restart the dormant engine. In the event of failure of the automatic restart of the dormant engine, however, certain embodiments provide additional safety measures, such as an emergency manual backup restart system if the auto-restart feature fails. For example, in response to failure of the automatic restart feature to restart the dormant engine, certain embodiments annunciate the failure and provide a backup manual restart capability through which the crew may attempt to restart the shutdown engine. In certain embodiments, a dedicated restart mechanism (e.g., a button or other input mechanism) is provided to the pilot in a convenient location (e.g., on the cyclic or collective stick) and is sufficient to initiate the manual restart.

In certain embodiments, the automatic restart capability and the backup manual restart capability use a fast-start engine-start system for restarting the dormant engine. Such embodiments may bypass a normal/primary engine-start system that would typically be used to restart an engine in flight. The restart capability may be facilitated by the manner of shutting down an engine to enter REO flight mode. For example, the engine may be shut down by closing an FMM SOV that, when reopened, not only allows airframe fuel SOV to remain open through REO flight mode, which itself facilitates rapid restoration of fuel delivery, but also may allow for faster resumption of fuel delivery to an engine being restarted.

Certain embodiments of the automatic restart and/or backup manual restart systems meet the failure probability of less that $(1*10^{-09})/FH$, where FH is flight hours, for loss of restart function in conjunction with engine failure.

Certain embodiments implement a crew alerting system that provides aircraft situational awareness to the flight crew to safely fly the aircraft in connection with REO flight mode. Certain embodiments provide Warning, Caution, and Alerting messages (e.g., audio and or visual) to provide the situational awareness. Alerting messages may include advisory and status messages to create situational awareness of the aircraft in connection with REO flight mode. The alerting messages may include warning and caution messages to alert the crew to take actions to recover from an unsafe condition resulting from failures in connection with REO flight mode.

Certain embodiments include recognizing the availability of REO flight mode, recognizing engagement of REO flight mode, indicating the engine to be shut down for REO flight mode, distinguishing between an engine failure and an intentional engine shutdown in connection with REO flight mode, alerting the flight crew to restart dormant engine if running engine fails, and alerting the pilot to restart dormant engine when transitioning from REO flight mode to a descent phase.

Certain of these features, individually or collectively, may improve safety when implementing REO flight mode in an aircraft, such as a rotorcraft.

Example embodiments of this disclosure are summarized here. Other embodiments can also be understood from the entirety of the specification as well as the claims filed herein.

Example 1. A rotorcraft includes a first engine, a second engine, a primary engine-start system for the first engine, a fast-start engine-start system for the first engine, and a computer system. The computer system is configured to detect a failure of the second engine during a reduced engine operation (REO) flight mode in which the first engine has been intentionally shut down inflight and the second engine is to remain operational, and to automatically initiate, in response to detecting the failure of the second engine during the REO flight mode, an automatic restart of the first engine using the fast-start engine-start system.

Example 2. The rotorcraft of Example 1, where during the automatic restart of the first engine, positions of one or more control components for initiating a start of the first engine using the primary engine-start system are unaffected by the automatic restart of the first engine using the fast-start engine-start system.

Example 3. The rotorcraft of any one of Examples 1-2, where the one or more control components for initiating a start of the first engine using the primary engine-start system include an engine start switch, and where automatically initiating, in response to detecting the failure of the second engine during the REO flight mode, the automatic restart of the first engine using the fast-start engine-start system includes controlling circuitry to selectively power the fast-start engine-start system rather than the primary engine-start system.

Example 4. The rotorcraft of any one of Examples 1-3, where the circuitry to selectively power the fast-start engine-start system rather than the primary engine-start system includes an auxiliary start relay, a start contactor, and a start isolation contactor; and where controlling circuitry to selectively power the fast-start engine-start system rather than the primary engine-start system includes controlling the auxiliary start relay to energize the start contactor to provide electrical power to either the primary engine-start system or the fast-start engine-start system, a state of the start isolation contactor causing the electrical power to be distributed to the fast-start engine-start system to thereby automatically initiate the automatic restart of the first engine using the fast-start engine-start system.

Example 5. The rotorcraft of any one of Examples 1-4, where the computer system is further configured to detect a failure of the automatic restart to start the first engine; annunciate, in response to detecting the failure of the automatic restart, the failure of the automatic restart to start the first engine; and attempt, in response to receiving a manual restart activation signal, a manual restart of the first engine using the fast-start engine-start system.

Example 6. The rotorcraft of any one of Examples 1-5, where a control for manually initiating the manual restart activation signal is located on one or more of a cyclic control stick or a collective control stick.

Example 7. The rotorcraft of any one of Examples 1-6, where attempting, in response to receiving the manual restart activation signal, includes providing electrical power to the fast-start engine-start system from a battery and providing electrical power to an engine ignitor from a battery.

Example 8. The rotorcraft of any one of Examples 1-7, where the computer system is configured to facilitate entering the REO flight mode by commanding the first engine to shut down inflight.

Example 9. The rotorcraft of any one of Examples 1-8, where the computer system is configured to command the first engine to shut down to enter the REO flight mode in response to an REO on/off switch for the first engine being moved to an on position, and where a primary run/off switch for the first engine remains in a run position while the first engine is shut down during the REO flight mode, the REO on/off switch for the first engine being distinct from the primary run/off switch for the first engine.

Example 10. The rotorcraft of any one of Examples 1-9, where, to command the first engine to shut down to enter the REO flight mode, the computer system causes an engine FMM shutoff valve for the first engine to close to terminate a flow of fuel to the first engine and thereby shut down the first engine.

Example 11. The rotorcraft of any one of Examples 1-10, where an airframe fuel shutoff valve remains open while in the REO flight mode.

Example 12. The rotorcraft of any one of Examples 1-14 where the computer system is further configured to cause the REO on/off switch to be held in an on position during REO flight mode, and to disable, in response to detecting that an REO flight mode disabling condition is met, the REO flight mode by deenergizing the REO on/off switch that is held in the on position while in the REO flight mode, deenergizing the REO on/off switch causing the REO on/off switch to move to an off position and thereby remove the command to the first engine to shut down.

Example 13. The rotorcraft of any one of Examples 1-12, where the computer system is further configured to detect, following detecting that the REO flight mode disabling condition is met, that the REO flight mode remains active, and to directly disengage, in response to detecting that the REO flight mode remains active, the REO flight mode.

Example 14. The rotorcraft of any one of Examples 1-13, where the computer system includes a flight control computer system, cockpit display unit, and engine control computer.

Example 15. A rotorcraft includes a first engine, a second engine, a primary run/off switch for the first engine, an REO on/off switch, and a computer system. The REO on/off switch is configured to send, in response to being positioned in an on position, an engine shutoff signal. The REO on/off switch is distinct from the primary run/off switch for the first engine. The computer system is configured to receive the engine shutoff signal and command, in response to receiving the engine shutoff signal, the first engine to shut off to enter the REO flight mode in which the first engine has been intentionally shut down inflight and the second engine is to remain operational. The primary run/off switch for the first engine remains in the on position while the first engine is shut down during the REO flight mode.

Example 16. The rotorcraft of Example 15, where the computer system is configured to prevent the REO on/off switch from sending the engine shutoff signal unless REO preconditions are met.

Example 17. The rotorcraft of any one of Examples 15-16, where, to command the first engine to shut down to enter the REO flight mode, the computer system causes an engine fuel management module (FMM) shutoff valve for the first engine to close to terminate a flow of fuel to the first engine and thereby shut down the first engine, an airframe fuel shutoff valve remaining open while in the REO flight mode.

Example 18. The rotorcraft of any one of Examples 15-17, where the computer system is further configured to cause the REO on/off switch to be held in an on position during REO flight mode, and to disable, in response to detecting that an REO flight mode disabling condition is met, the REO flight mode by deenergizing the REO on/off switch that is held in the on position while in the REO flight mode, deenergizing the REO on/off switch causing the REO on/off switch to move to an off position and thereby remove the command to the first engine to shut down.

Example 19. The rotorcraft of any one of Examples 15-18, where the computer system is further configured to detect, following detecting that the REO flight mode disabling condition is met, that the REO flight mode remains active, and to directly disengage, in response to detecting that the REO flight mode remains active, the REO flight mode.

Example 20. A method includes detecting, for a rotorcraft that includes a first engine and a second engine and that is in flight operating using both the first engine and the second engine, availability of an REO flight mode in which in which the first engine is intentionally shut down inflight and the second engine is to remain operational and initiating a shutdown of the first engine to enter the REO flight mode. Initiating the shutdown of the first engine includes bypassing a primary shutdown system for the first engine and shutting down the first engine using a secondary shutdown system.

Example 21. The method of Example 20, wherein initiating the shutdown of the first engine to enter the REO flight mode is performed in response to an REO on/off switch for the first engine being moved to an on position, and a primary run/off switch for the first engine remains in a run position while the first engine is shut down during the REO flight mode, the REO on/off switch for the first engine being distinct from the primary run/off switch for the first engine.

Example 22. The method of any one of Examples 20-21, where bypassing the primary shutdown system for the first engine and shutting down the first engine using a secondary shutdown system includes causing an engine FMM shutoff valve for the first engine to close to terminate a flow of fuel to the first engine and thereby shut down the first engine, an airframe fuel shutoff valve remaining open while in the REO flight mode.

Example 23. The method of any one of Examples 20-22, further including causing the REO on/off switch to be held in an on position during REO flight mode and disabling, in response to detecting that an REO flight mode disabling condition is met, the REO flight mode by deenergizing the REO on/off switch that is held in the on position while in the REO flight mode, deenergizing the REO on/off switch causing the REO on/off switch to move to an off position and thereby remove a command to the first engine to shut down.

Example 24. The method of any one of Examples 20-23, further including detecting, following detecting that the REO flight mode disabling condition is met, that the REO flight mode remains active, and directly disengaging, in response to detecting that the REO flight mode remains active, the REO flight mode.

Example 25. The method of any one of Examples 20-24, where the rotorcraft further includes a primary engine-start system for the first engine and a fast-start engine-start system for the first engine, and the method further includes detecting a failure of the second engine during the REO flight mode in which the first engine has been intentionally shut down inflight and the second engine is to remain operational, and automatically initiating, in response to detecting the failure of the second engine during the REO flight mode, an automatic restart of the first engine using the fast-start engine-start system.

Example 26. The method of any one of Examples 20-25, where during the automatic restart of the first engine, positions of one or more control components for initiating a start of the first engine using the primary engine-start system are unaffected by the automatic restart of the first engine using the fast-start engine-start system.

Example 27. The method of any one of Examples 20-26, where the one or more control components for initiating a start of the first engine using the primary engine-start system comprise an engine start switch, and where automatically initiating, in response to detecting the failure of the second engine during the REO flight mode, the automatic restart of the first engine using the fast-start engine-start system includes controlling circuitry to selectively power the fast-start engine-start system rather than the primary engine-start system.

Example 28. The method of any one of Examples 20-27, where the circuitry to selectively power the fast-start engine-start system rather than the primary engine-start system includes an auxiliary start relay, a start contactor, and a start isolation contactor, and where controlling circuitry to selectively power the fast-start engine-start system rather than the primary engine-start system includes controlling the auxiliary start relay to energize the start contactor to provide electrical power to either the primary engine-start system or the fast-start engine-start system, a state of the start isolation contactor causing the electrical power to be distributed to the fast-start engine-start system to thereby automatically initiate the automatic restart of the first engine using the fast-start engine-start system.

Example 29. The method of any one of Examples 20-28, further including detecting a failure of the automatic restart to start the first engine; annunciating, in response to detecting the failure of the automatic restart, the failure of the automatic restart to start the first engine; and attempting, in response to receiving a manual restart activation signal a manual restart of the first engine using the fast-start engine-start system.

Example 30. The method of any one of Examples 20-29, where a control for manually initiating the manual restart activation signal is located on one or more of a cyclic control stick or a collective control stick.

Example 31. The method of any one of Examples 20-30, where attempting, in response to receiving the manual restart activation signal, includes providing electrical power to the fast-start engine-start system from a battery and providing electrical power to an engine ignitor from a battery.

Illustrative embodiments of the system and method of the present disclosure are described herein. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

While this disclosure has been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

What is claimed is:

1. A rotorcraft, comprising:
   a first engine;
   a second engine;
   a primary run/off switch for the first engine;
   a reduced engine operation (REO) on/off switch configured to send, in response to being positioned in an on position, an engine shutoff signal, the REO on/off switch being distinct from the primary run/off switch for the first engine; and
   a computer system configured to:
      receive the engine shutoff signal; and
      command, in response to receiving the engine shutoff signal, the first engine to shut off to enter an REO flight mode in which the first engine has been intentionally shut down inflight and the second engine is to remain operational, the primary run/off switch for the first engine remaining in the on position while the first engine is shut down during the REO flight mode.

2. The rotorcraft of claim 1, wherein the computer system is configured to prevent the REO on/off switch from sending the engine shutoff signal unless REO preconditions are met.

3. The rotorcraft of claim 1, wherein, to command the first engine to shut down to enter the REO flight mode, the computer system causes an engine fuel management module (FMM) shutoff valve for the first engine to close to terminate a flow of fuel to the first engine and thereby shut down the first engine, an airframe fuel shutoff valve remaining open while in the REO flight mode.

4. The rotorcraft of claim 1, wherein the computer system is further configured to:
   cause the REO on/off switch to be held in an on position during REO flight mode; and
   disable, in response to detecting that an REO flight mode disabling condition is met, the REO flight mode by deenergizing the REO on/off switch that is held in the on position while in the REO flight mode, deenergizing the REO on/off switch causing the REO on/off switch to move to an off position and thereby remove the command to the first engine to shut down.

5. The rotorcraft of claim 4, wherein the computer system is further configured to:
   detect, following detecting that the REO flight mode disabling condition is met, that the REO flight mode remains active; and
   directly disengage, in response to detecting that the REO flight mode remains active, the REO flight mode.

6. The rotorcraft of claim 1, wherein:
   the rotorcraft comprises:
      a primary engine-start system for the first engine, the primary run/off switch for the first engine being part of the primary engine-start system for the first engine; and
      a fast-start engine-start system for the first engine; and
   the computer system is further configured to:
      detect a failure of the second engine during the REO flight mode in which the first engine has been intentionally shut down inflight and the second engine is to remain operational; and
      automatically initiate, in response to detecting the failure of the second engine during the REO flight mode, an automatic restart of the first engine using the fast-start engine-start system.

7. The rotorcraft of claim 6, wherein during the automatic restart of the first engine, positions of one or more control components for initiating a start of the first engine using the primary engine-start system are unaffected by the automatic restart of the first engine using the fast-start engine-start system.

8. The rotorcraft of claim 7, wherein:
   the one or more control components for initiating a start of the first engine using the primary engine-start system comprise an engine start switch; and
   automatically initiating, in response to detecting the failure of the second engine during the REO flight mode, the automatic restart of the first engine using the fast-start engine-start system comprises controlling circuitry to selectively power the fast-start engine-start system rather than the primary engine-start system.

9. The rotorcraft of claim 8, wherein:
   the circuitry to selectively power the fast-start engine-start system rather than the primary engine-start system comprises:
      an auxiliary start relay;
      a start contactor; and
      a start isolation contactor; and
   controlling circuitry to selectively power the fast-start engine-start system rather than the primary engine-start system comprises controlling the auxiliary start relay to energize the start contactor to provide electrical power to either the primary engine-start system or the fast-start engine-start system, a state of the start isolation contactor causing the electrical power to be distributed to the fast-start engine-start system to thereby automatically initiate the automatic restart of the first engine using the fast-start engine-start system.

10. The rotorcraft of claim 6, wherein the computer system is further configured to:

detect a failure of the automatic restart to start the first engine;

annunciate, in response to detecting the failure of the automatic restart, the failure of the automatic restart to start the first engine; and attempt, in response to receiving a manual restart activation signal, a manual restart of the first engine using the fast-start engine-start system.

11. The rotorcraft of claim 10, wherein a control for manually initiating the manual restart activation signal is located on one or more of:

a cyclic control stick; or a collective control stick.

12. The rotorcraft of claim 10, wherein attempting, in response to receiving the manual restart activation signal, comprises providing electrical power to the fast-start engine-start system from a battery and providing electrical power to an engine ignitor from a battery.

\* \* \* \* \*